United States Patent
Witten et al.

(10) Patent No.: US 10,958,666 B1
(45) Date of Patent: Mar. 23, 2021

(54) SYSTEMS AND METHODS FOR VERIFYING CONNECTION INTEGRITY

(71) Applicant: Symantec Corporation, Mountain View, CA (US)

(72) Inventors: Brian Witten, Hermosa Beach, CA (US); Qing Li, Cupertino, CA (US); Ronald Frederick, Mountain View, CA (US); Roelof Du Toit, Portersville, PA (US); Susanta Nanda, Santa Clara, CA (US); Saurabh Shintre, Sunnyvale, CA (US); Darren Shou, La Jolla, CA (US)

(73) Assignee: NortonLifeLock Inc., Tempe, AZ (US)

( * ) Notice: Subject to any disclaimer, the term of this patent is extended or adjusted under 35 U.S.C. 154(b) by 542 days.

(21) Appl. No.: 15/468,391

(22) Filed: Mar. 24, 2017

(51) Int. Cl.
*H04L 29/06* (2006.01)
*H04L 9/32* (2006.01)
*H04L 12/26* (2006.01)

(52) U.S. Cl.
CPC ........ *H04L 63/126* (2013.01); *H04L 9/3265* (2013.01); *H04L 9/3268* (2013.01);
(Continued)

(58) Field of Classification Search
CPC ... H04L 63/126; H04L 9/3265; H04L 9/3268; H04L 63/0823; H04L 63/166; H04L 67/42; H04L 63/0428
See application file for complete search history.

(56) References Cited

U.S. PATENT DOCUMENTS 5,687,235 A * 11/1997 Perlman ............... H04L 9/3268
380/30
8,078,866 B2 * 12/2011 Xiao ..................... G06F 21/604
713/157
(Continued)

FOREIGN PATENT DOCUMENTS

WO WO-2017001133 A1 * 1/2017 ......... H04L 63/0281

OTHER PUBLICATIONS

Naylor et al ("Naylor," Multi-Context TLS (mcTLS) Enabling Secure In-Network Functionality in TLS, SIGCOMM '15, Aug. 17-21, 2015, pp. 1-14).*
(Continued)

*Primary Examiner* — Luu T Pham
*Assistant Examiner* — James J Wilcox
(74) *Attorney, Agent, or Firm* — FisherBroyles, LLP

(57) ABSTRACT

The disclosed computer-implemented method for verifying connection integrity may include (i) receiving a request from a client to initiate a connection to a server via a middlebox, (ii) receiving, from the client, via a side protocol executing in parallel with a transport layer security protocol, a request for a certificate for the middlebox, (iii) sending, to the client, via the side protocol, the certificate, (iv) receiving, from the client, via the side protocol, a request for an additional certificate from a device upstream of the middlebox, (v) requesting, from the device upstream of the middlebox, via the side protocol, the additional certificate, (vi) receiving, from the device upstream of the middlebox, via the side
(Continued)

protocol, the additional certificate, (vii) sending, to the client, via the side protocol, the additional certificate, and (viii) relaying data via the connection. Various other methods, systems, and computer-readable media are also disclosed.

17 Claims, 10 Drawing Sheets

(52) U.S. Cl.
CPC ...... *H04L 43/0811* (2013.01); *H04L 63/0823* (2013.01); *H04L 63/166* (2013.01); *H04L 67/42* (2013.01); *H04L 63/0428* (2013.01)

(56) References Cited

U.S. PATENT DOCUMENTS

| | | | | |
|---|---|---|---|---|
| 8,560,851 B1* | 10/2013 | Cherukumudi | ....... | H04L 9/3263 713/169 |
| 9,455,980 B2* | 9/2016 | Xie | ........ | H04L 63/062 |
| 2004/0054899 A1* | 3/2004 | Balfanz | ........ | H04L 67/12 713/168 |
| 2005/0021969 A1* | 1/2005 | Williams | ........ | H04L 9/3268 713/176 |
| 2007/0204149 A1* | 8/2007 | Balfanz | ........ | H04L 63/18 713/156 |
| 2008/0022389 A1* | 1/2008 | Calcev | ........ | H04W 40/28 726/14 |
| 2008/0072305 A1* | 3/2008 | Casado | ........ | H04L 67/18 726/11 |
| 2010/0025466 A1* | 2/2010 | Cardone | ........ | H04L 9/3268 235/386 |
| 2011/0075845 A1* | 3/2011 | Calcev | ........ | H04L 63/045 380/278 |
| 2011/0219227 A1* | 9/2011 | Sharif | ........ | G06F 21/33 713/158 |
| 2012/0079104 A1* | 3/2012 | Casado | ........ | H04L 63/10 709/224 |
| 2012/0079585 A1* | 3/2012 | Chan | ........ | H04L 63/0823 726/10 |
| 2012/0297474 A1* | 11/2012 | Zhang | ........ | H04W 76/15 726/10 |
| 2013/0046972 A1* | 2/2013 | Campagna | ........ | H04L 9/0844 713/156 |
| 2013/0212379 A1* | 8/2013 | Dixon | ........ | H04L 9/3268 713/156 |
| 2013/0236177 A1* | 9/2013 | Fang | ........ | H04L 5/0007 398/66 |
| 2014/0059190 A1* | 2/2014 | Calo | ........ | H04L 47/10 709/221 |
| 2014/0059191 A1* | 2/2014 | Calo | ........ | H04L 43/04 709/221 |
| 2014/0068602 A1* | 3/2014 | Gember | ........ | H04L 12/4633 718/1 |
| 2014/0359280 A1* | 12/2014 | Saboor | ........ | H04L 9/321 713/156 |
| 2014/0359281 A1* | 12/2014 | Saboori | ........ | H04L 9/3265 713/156 |
| 2016/0036593 A1* | 2/2016 | Saboori | ........ | H04L 9/321 713/156 |
| 2016/0050131 A1* | 2/2016 | Zhang | ........ | H04L 41/0681 370/244 |
| 2016/0330087 A1* | 11/2016 | Calo | ........ | H04L 47/12 |
| 2016/0330194 A1* | 11/2016 | Loehr | ........ | H04W 12/0802 |
| 2016/0373298 A1* | 12/2016 | Calo | ........ | H04L 67/42 |
| 2017/0093587 A1* | 3/2017 | Glisson | ........ | H04L 9/321 |
| 2017/0093984 A1* | 3/2017 | Dhanabalan | ........ | H04L 67/10 |
| 2017/0180382 A1* | 6/2017 | Taylor | ........ | H04L 63/101 |
| 2017/0214660 A1* | 7/2017 | Shah | ........ | H04L 63/0272 |
| 2017/0223053 A1* | 8/2017 | Dhanabalan | ........ | H04L 63/1408 |
| 2017/0295156 A1* | 10/2017 | Spencer | ........ | H04L 41/0806 |
| 2019/0149581 A1* | 5/2019 | Silvestro | ........ | H04L 63/0428 726/1 |

OTHER PUBLICATIONS

Taylor—"Validating Security Protocols with Cloud-based Middleboxes," 2016 IEEE Conference on Communications and Network Security, pp. 1-9 (Year: 2016).* mcTLS; The Multi-Context TLS (mcTLS) Protocol; http://mctls.org/documentation.html; as accessed on Mar. 8, 2017.

Justine Sherry; A Ten Minute Introduction to Middleboxes; Berkeley University of California; http://yuba.stanford.edu/~huangty/sigcomm15_preview/mbpreview.pdf; accessed Mar. 8, 2017.

mcTLS; Tech Specs; http://mbtls.org/documentation.html; as accessed on Mar. 8, 2017.

Wilson et al.; Auditing IoT Communications with TLS-RAR; Apr. 11, 2016; Standford University.

* cited by examiner

SYSTEMS AND METHODS FOR VERIFYING CONNECTION INTEGRITY

BACKGROUND

Every day, millions of vital transactions take place over networks. Data is sent back and forth between computers on private local networks and between computers and servers on the Internet. Financial transactions, legal documents, news articles, and data of all types flow through network connections. Many resources are devoted to securing those network connections, attempting to ensure that data downloaded from other computing devices doesn't harm the receiving device and also doesn't break any relevant laws, regulations, or organizational policies. Many resources are also devoted to ensuring that nothing tampers with the connection between one computing device and another by intercepting or even altering data for malicious purposes. Maintaining the integrity and authentication of the content passed between computing devices is essential to enabling users to safely perform transactions over networks.

Some traditional systems for maintaining the safety of network connections rely on encrypting traffic from end to end. However, many of these traditional systems are broken by the introduction of middleboxes, devices which decrypt traffic in order to inspect it for a variety of purposes. Some middleboxes, such as firewalls, may be beneficial to users, but others may not be so benign, and traditional systems may lack a means for authenticating the middleboxes that relay traffic between a client device and a server. The instant disclosure, therefore, identifies and addresses a need for systems and methods for helping clients authenticate each middlebox in a connection and ensuring integrity and authentication of content sent to the client.

SUMMARY

As will be described in greater detail below, the instant disclosure describes various systems and methods for verifying connection integrity.

In one embodiment, a computer-implemented method for verifying connection integrity may include (i) receiving, by a middlebox that is capable of examining traffic between a client computing device and a server, a request from the client computing device to initiate a connection to the server via the middlebox using a transport layer security protocol, (ii) receiving, by the middlebox, from the client computing device, via a side protocol executing in parallel with the transport layer security protocol, a request for a certificate for the middlebox that attests to a trustworthiness of content, (iii) sending, by the middlebox to the client computing device, via the side protocol executing in parallel with the transport layer security protocol, the certificate for the middlebox, (iv) receiving, by the middlebox, from the client computing device, via the side protocol, a request for an additional certificate from a device upstream of the middlebox that attests to the trustworthiness of the content, (v) requesting, by the middlebox, from the device upstream of the middlebox, via the side protocol, the additional certificate for the device upstream from the middlebox, (vi) receiving, by the middlebox, from the device upstream of the middlebox, via the side protocol, the additional certificate for the device upstream of the middlebox that attests to the trustworthiness of the content, (vii) sending, from the middlebox to the client computing device, via the side protocol, the additional certificate for the device upstream from the middlebox, and (viii) relaying data from the client computing device to the server, using the transport layer security protocol, via the connection that was validated by the client computing device in response to the middlebox sending the additional certificate.

In one embodiment, the certificate for the middlebox that attests to the trustworthiness of the content may include a dynamically generated certificate that identifies the middlebox as being the server. In one embodiment, sending, from the middlebox to the client computing device, via the side protocol, the additional certificate for the device upstream from the middlebox may include receiving, from the client computing device, via the side protocol, a request for a certificate for each successive device immediately upstream from a most recent device for which the middlebox has sent a certificate until the client computing device receives a certificate from the middlebox that is recognized as globally trusted by the client computing device and sending, from the middlebox to the client computing device, via the side protocol, the certificate for each successive device immediately upstream from the most recent device for which the middlebox has sent a certificate until the client computing device receives the certificate from the middlebox that is recognized as globally trusted by the client computing device.

In one embodiment, the computer-implemented method may further include (i) receiving, via the connection, using transport layer security protocol, from an upstream device, data originating from the server and bound for the client computing device, (ii) receiving, from the upstream device via the side protocol, a manifest that describes the data, (iii) altering the data bound for the client computing device, (iv) creating a new manifest that describes the altered data, (v) signing the new manifest that describes the altered data with a key corresponding to the certificate for the middlebox, (vi) sending the altered data to the client computing device via the connection, using transport layer security protocol, and (vii) sending the new manifest that describes the altered data to the client computing device via the side protocol. In some examples, altering the data bound for the client computing device may include decrypting the data bound for the client computing device in order to examine the data.

In one embodiment, the computer-implemented method may further include (i) receiving, by the middlebox, from the server, via the side protocol executing in parallel with the transport layer security protocol, a request for a certificate for the middlebox that attests to the trustworthiness of content, (ii) sending, by the middlebox to the server, via the side protocol executing in parallel with the transport layer security protocol, the certificate for the middlebox, (iii) receiving, by the middlebox, from the server, via the side protocol, a request for a certificate from the client computing device that attests to the trustworthiness of the content, (iv) requesting, by the middlebox, from the client computing device, via the side protocol, the certificate for the client computing device, (v) receiving, by the middlebox, from the client computing device, via the side protocol, the certificate for the client computing device that attests to the trustworthiness of the content, and (vi) sending, from the middlebox to the server, via the side protocol, the certificate for the client computing device.

In one embodiment, a computer-implemented method for verifying connection integrity may include (i) initiating, by a client computing device, a connection to a server using a transport layer security protocol, where the connection is mediated by at least one middlebox that is capable of examining traffic between the client computing device and the server, (ii) requesting, by the client computing device, via a side protocol executing in parallel with the transport layer security protocol, a certificate for the middlebox that attests to a trustworthiness of content, (iii) receiving, by the client computing device from the middlebox, via the side protocol executing in parallel with the transport layer security protocol, the certificate for the middlebox, (iv) requesting, by the client computing device, via the side protocol, in response to the client computing device determining that the certificate is not recognized as globally trusted by the client computing device, an additional certificate from a device upstream of the middlebox that attests to the trustworthiness of the content, (v) receiving, by the client computing device from the middlebox, via the side protocol, the additional certificate for the device upstream from the middlebox, and (vi) sending data from the client computing device to the server via the connection using the transport layer security protocol in response to determining that the additional certificate for the device upstream from the middlebox is recognized as globally trusted by the client computing device.

In one embodiment, requesting, by the client computing device, via the side protocol, the additional certificate may include (i) requesting, by the client computing device, from the middlebox, via the side protocol, a certificate for a device immediately upstream of the middlebox, (ii) receiving, by the client computing device, from the middlebox, via the side protocol, the certificate for the device immediately upstream of the middlebox, and (iii) continuing to request, by the client computing device, from the middlebox, via the side protocol, a certificate for each successive device immediately upstream from a most recent device for which the client computing device has received a certificate until the client computing device receives a certificate that is recognized as globally trusted by the client computing device.

In one embodiment, the client computing device may continue to request the certificate for each successive device until the client computing device receives a certificate for the server. In some examples, determining that the additional certificate for the device upstream from the middlebox is recognized as globally trusted by the client computing device may include determining, by the client computing device, that the additional certificate is chained to a globally trusted root certificate.

In one embodiment, the middlebox may be capable of modifying traffic between the client computing device and the server. In one example, the computer-implemented method may further include receiving, by the client computing device, via the connection using the transport layer security protocol, data from the server and receiving, by the client computing device, via the side protocol, a manifest describing alterations made to the data by the middlebox. In some examples, the computer-implemented method may further include displaying to a user of a client computing device a notification indicating that the data from the server was altered by the middlebox.

In one embodiment, a system for implementing the above-described method may include (i) a client connection module, stored in memory, that initiates, by a client computing device, a connection to a server using a transport layer security protocol, where the connection is mediated by at least one middlebox that is capable of examining traffic between the client computing device and the server, (ii) a middlebox connection module, stored in memory, that receives, by the middlebox, a request from the client computing device to initiate the connection to the server via the middlebox using the transport layer security protocol, (iii) a client certificate module, stored in memory, that requests, by the client computing device, via a side protocol executing in parallel with the transport layer security protocol, a certificate for the middlebox that attests to a trustworthiness of content, (iv) a middlebox certificate module, stored in memory, that (a) receives, by the middlebox, from the client computing device, via the side protocol executing in parallel with the transport layer security protocol, a request for the certificate for the middlebox that attests to the trustworthiness of the content and (b) sends, by the middlebox to the client computing device, via the side protocol executing in parallel with the transport layer security protocol, the certificate for the middlebox and (v) at least one physical processor configured to execute the client connection module, the middlebox connection module, the client certificate module, and the middlebox certificate module. In some embodiments, the client certificate module may receive, by the client computing device from the middlebox, via the side protocol executing in parallel with the transport layer security protocol, the certificate for the middlebox and may request, by the client computing device, via the side protocol, in response to the client computing device determining that the certificate is not recognized as globally trusted by the client computing device, an additional certificate from a device upstream of the middlebox that attests to the trustworthiness of the content. In these embodiments, the middlebox certificate module may (i) receive, by the middlebox, from the client computing device, via the side protocol, a request for the additional certificate from the device upstream of the middlebox that attests to the trustworthiness of content, (ii) request, by the middlebox, from the device upstream of the middlebox, via the side protocol, the additional certificate for the device upstream from the middlebox, (iii) receive, by the middlebox, from the device upstream of the middlebox, via the side protocol, the additional certificate for the device upstream of the middlebox that attests to the trustworthiness of the content, and (iv) send, from the middlebox to the client computing device, via the side protocol, the additional certificate for the device upstream from the middlebox. Additionally, in these embodiments, the client certificate module may receive, by the client computing device from the middlebox, via the side protocol, the additional certificate for the device upstream from the middlebox, the client connection module may send data from the client computing device to the server via the connection using the transport layer security protocol in response to determining that the additional certificate for the device upstream from the middlebox is recognized as globally trusted by the client computing device, and the middlebox connection module may relay the data from the client computing device to the server, using the transport layer security protocol, via the connection that was validated by the client computing device in response to the middlebox sending the additional certificate.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, by a middlebox that is capable of examining traffic between a client computing device and a server, a request from the client computing device to initiate a connection to the server via the middlebox using a transport layer security protocol, (ii) receive, by the middlebox, from the client computing device, via a side protocol executing in parallel with the transport layer security protocol, a request for a certificate for the middlebox that attests to a trustworthiness of content, (iii) send, by the middlebox to the client computing device, via the side protocol executing in parallel with the transport layer security protocol, the certificate for the middlebox, (iv) receive, by the middlebox, from the client computing device, via the side protocol, a request for an additional certificate from a device upstream of the middlebox that attests to the trustworthiness of the content, (v) request, by the middlebox, from the device upstream of the middlebox, via the side protocol, the additional certificate for the device upstream from the middlebox, (vi) receive, by the middlebox, from the device upstream of the middlebox, via the side protocol, the additional certificate for the device upstream of the middlebox that attests to the trustworthiness of the content, (vii) send, from the middlebox to the client computing device, via the side protocol, the additional certificate for the device upstream from the middlebox, and (viii) relay data from the client computing device to the server, using the transport layer security protocol, via the connection that was validated by the client computing device in response to the middlebox sending the additional certificate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
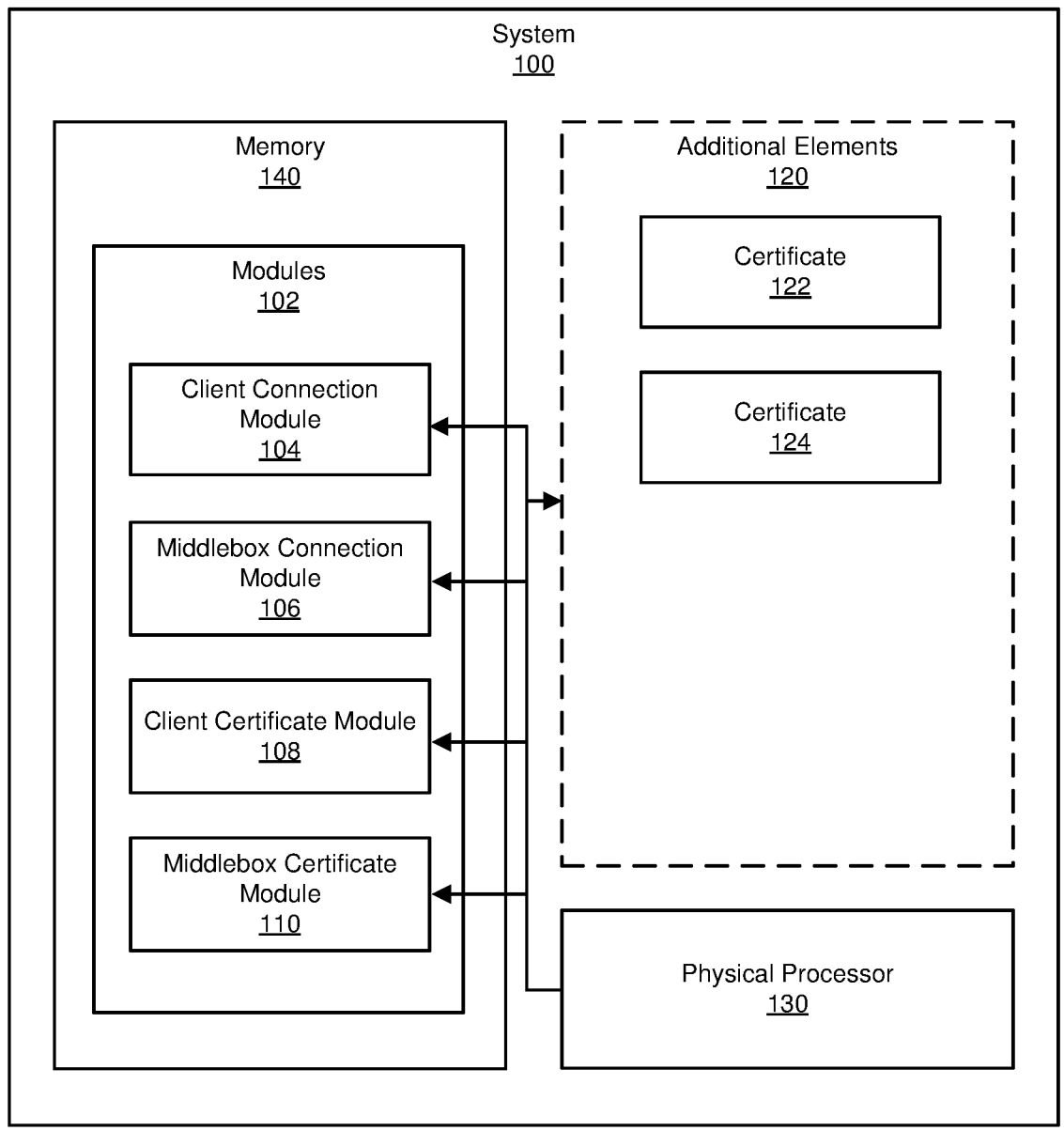
FIG. 1 is a block diagram of an example system for verifying connection integrity.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for verifying connection integrity. As will be explained in greater detail below, by requesting certificates from each middlebox in a connection until a globally trusted certificate is received, the systems and methods described herein may be able to gain visibility into many or all of the otherwise unknown and/or untrusted devices that will be handling data for a connection and may also be able to examine the certificate of the server rather than only examining the certificate of the first device upstream of the client. By requesting and examining certificates in this way, the systems and methods described herein may be able to verify the security of connections as well as collect a set of certificates to match against public keys that may be used by middleboxes to sign manifests indicating changes to data sent over the connection. By sending certificates and/or manifests in this way, middleboxes may improve the transparency of connections and enable clients to trust that data sent over the connection is not being tampered with. In addition, the systems and methods described herein may improve the functioning of a computing device by decreasing the chances that the computing device will send sensitive traffic via insecure connections.

Furthermore, the systems and methods described herein may provide and/or implement a protocol that (i) insures accountability any modification of content between a genuine server and an end client (and, thus, safely enabling such modification), even where multiple middleboxes mediate the genuine server and the end client, and (ii) identifies parties decrypting the content for inspection between the genuine server and the end client. In addition, these systems and methods may not require modifying, extending, revising, or constraining existing protocols (e.g., the Transport Layer Security (TLS) protocol).

Figure 2:
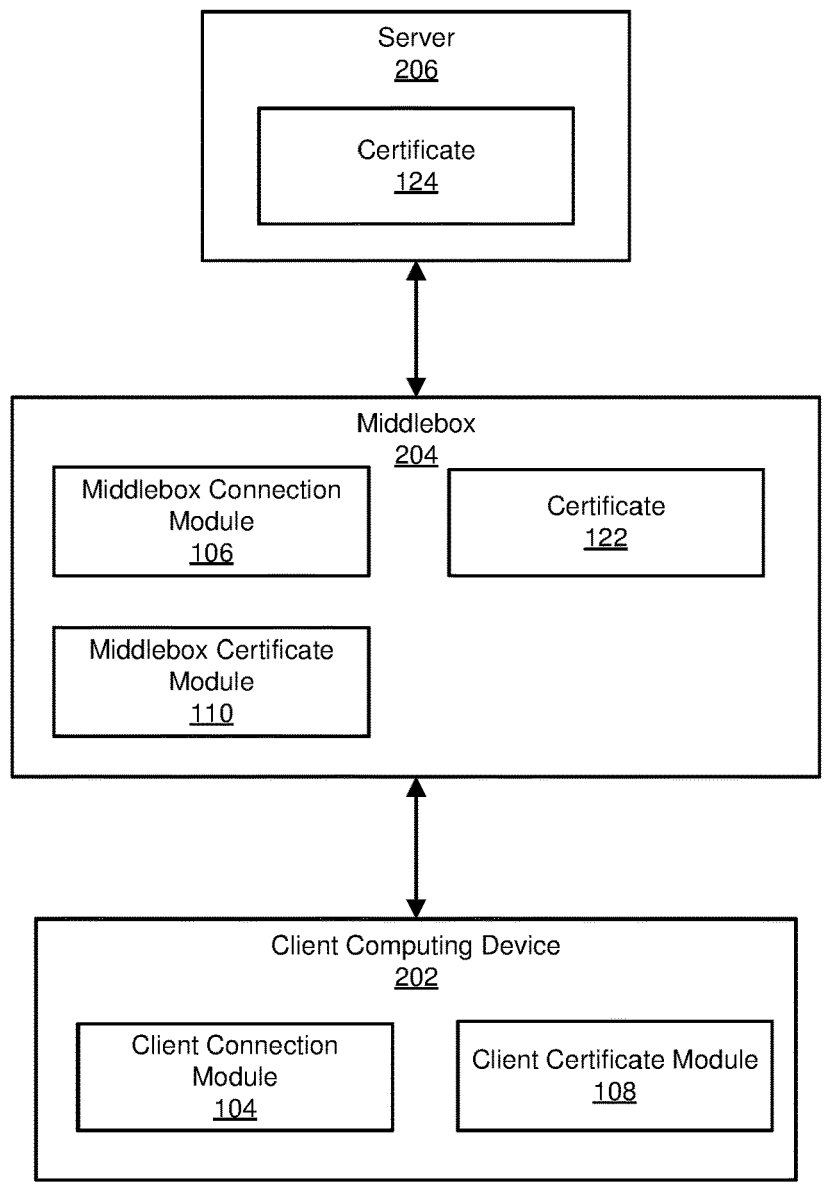
FIG. 2 is a block diagram of an additional example system for verifying connection integrity.
Figure 4:
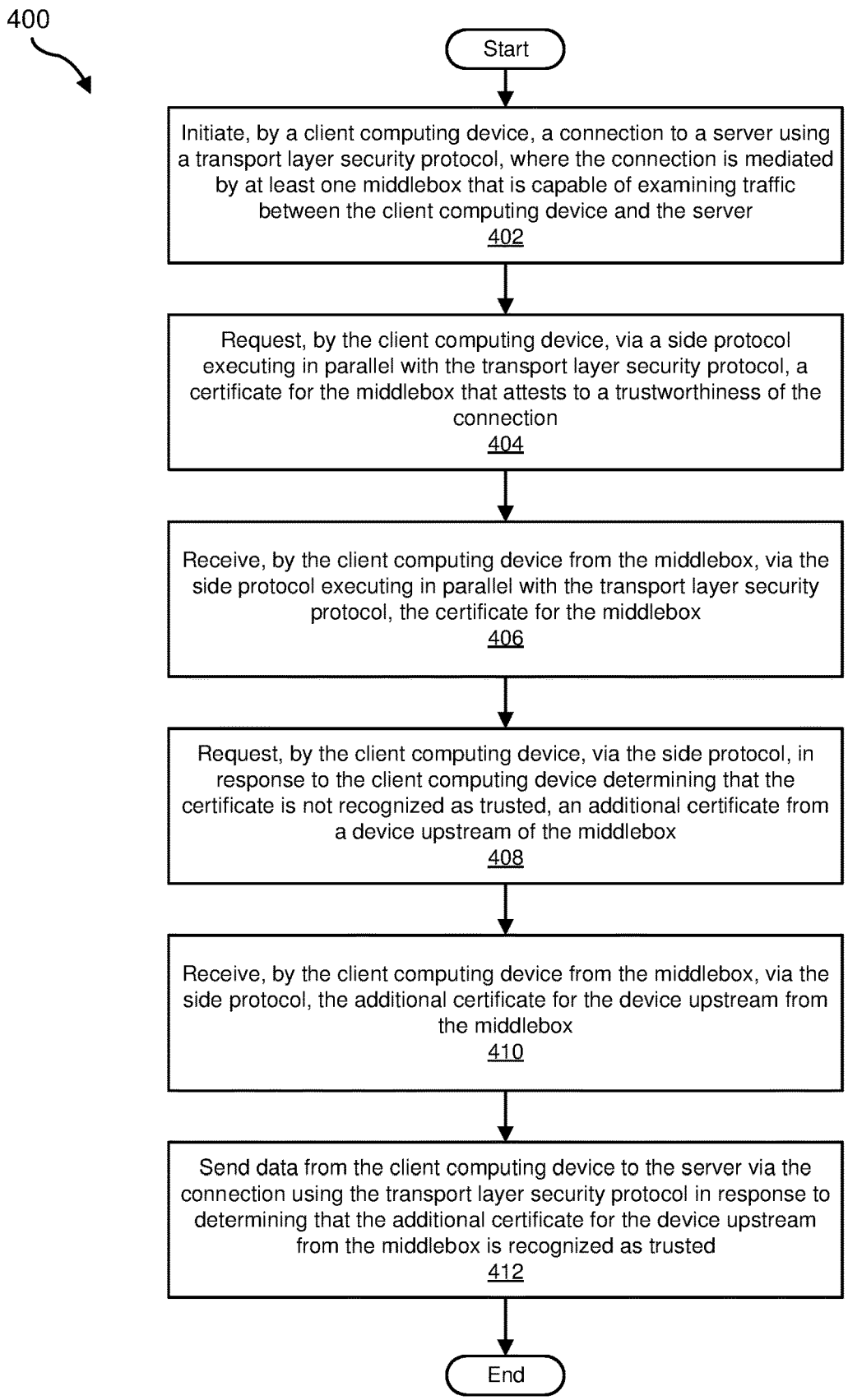
FIG. 4 is a flow diagram of an example method for verifying connection integrity.
Figure 5:
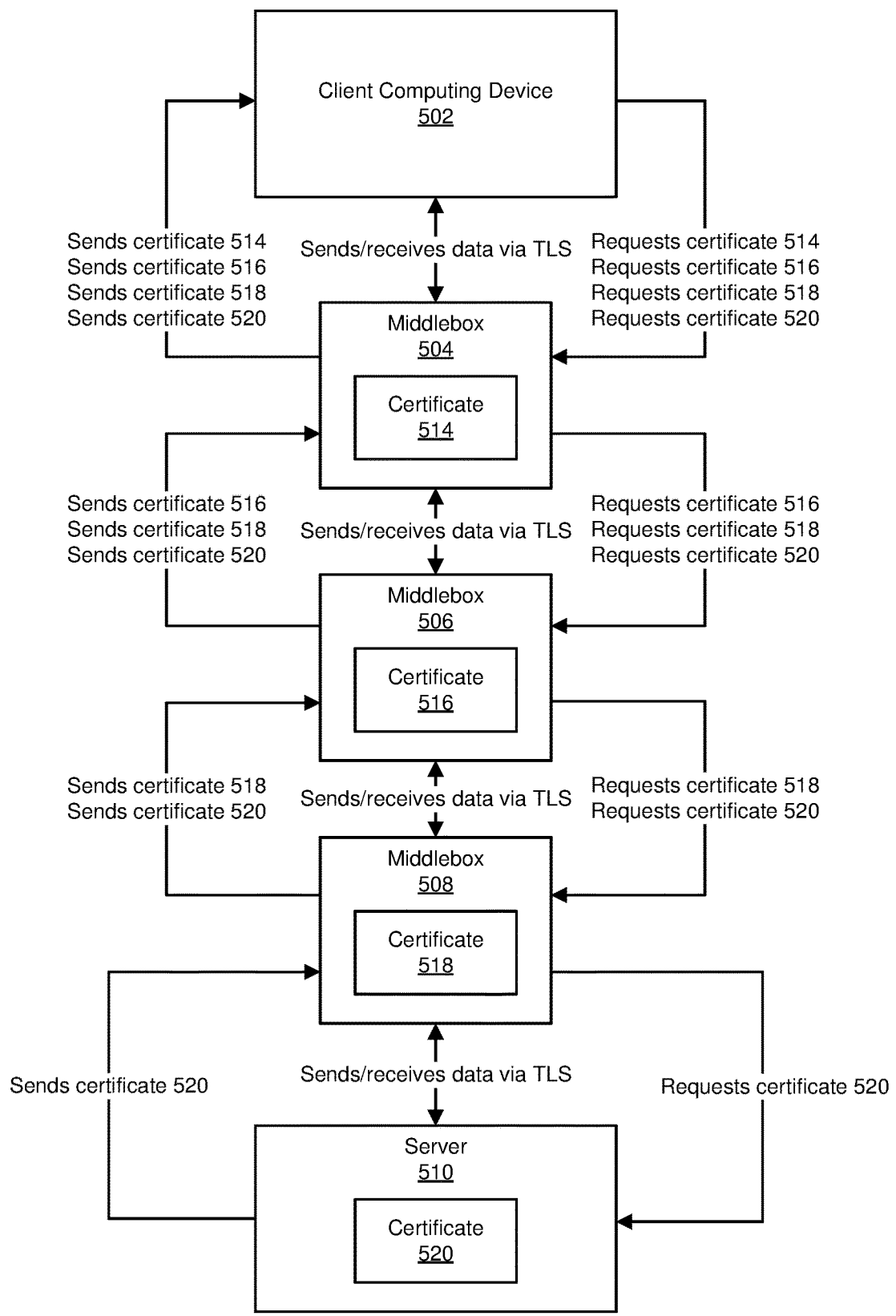
FIG. 5 is a block diagram of an example computing system for verifying connection integrity.

The following will provide, with reference to FIGS. 1, 2, and 5, detailed descriptions of example systems for verifying connection integrity. Detailed descriptions of corresponding computer-implemented methods will also be provided in connection with FIGS. 3 and 4. Detailed descriptions of example protocols will be provided in connection with FIGS. 6-8. In addition, detailed descriptions of an example computing system and network architecture capable of implementing one or more of the embodiments described herein will be provided in connection with FIGS. 9 and 10, respectively.

FIG. 1 is a block diagram of example system 100 for verifying connection integrity. As illustrated in this figure, example system 100 may include one or more modules 102 for performing one or more tasks. For example, and as will be explained in greater detail below, example system 100 may include a client connection module 104 that initiates, by a client computing device, a connection to a server using a transport layer security protocol, where the connection is mediated by at least one middlebox that is capable of examining traffic between the client computing device and the server, a middlebox connection module 106 that receives, by the middlebox, a request from the client computing device to initiate the connection to the server via the middlebox using the transport layer security protocol, a client certificate module 108 that requests, by the client computing device, via a side protocol executing in parallel with the transport layer security protocol, a certificate for the middlebox that attests to a trustworthiness of content, and a middlebox certificate module 110 that receives, by the middlebox, from the client computing device, via the side protocol executing in parallel with the transport layer security protocol, a request for the certificate for the middlebox that attests to the trustworthiness of the content and sends, by the middlebox to the client computing device, via the side protocol executing in parallel with the transport layer security protocol, the certificate for the middlebox. In some embodiments, system 100 may include components of multiple devices. In one embodiment, memory 140 may represent memory components of multiple devices (including, e.g., one or more clients, middleboxes, and/or servers that may each execute portions or all of modules 102). Likewise, in some embodiments, physical processor 130 may represent multiple processors operating within multiple distinct devices (including, e.g., one or more clients, middleboxes, and/or servers that may each execute portions or all of modules 102).

In some embodiments, client certificate module 108 may receive, by the client computing device from the middlebox, via the side protocol executing in parallel with the transport layer security protocol, the certificate for the middlebox and may request, by the client computing device, via the side protocol, in response to the client computing device determining that the certificate is not recognized as globally trusted by the client computing device, an additional certificate from a device upstream of the middlebox that attests to the trustworthiness of the content. In these embodiments, middlebox certificate module 110 may (i) receive, by the middlebox, from the client computing device, via the side protocol, a request for the additional certificate from the device upstream of the middlebox that attests to the trustworthiness of the content, (ii) request, by the middlebox, from the device upstream of the middlebox, via the side protocol, the additional certificate for the device upstream from the middlebox, (iii) receive, by the middlebox, from the device upstream of the middlebox, via the side protocol, the additional certificate for the device upstream of the middlebox that attests to the trustworthiness of the content, and (iv) send, from the middlebox to the client computing device, via the side protocol, the additional certificate for the device upstream from the middlebox. Additionally, in these embodiments, client certificate module 108 may receive, by the client computing device from the middlebox, via the side protocol, the additional certificate for the device upstream from the middlebox, client connection module 104 may send data from the client computing device to the server via the connection using the transport layer security protocol in response to determining that the additional certificate for the device upstream from the middlebox is recognized as globally trusted by the client computing device, and/or middlebox connection module 106 may relay the data from the client computing device to the server, using the transport layer security protocol, via the connection that was validated by the client computing device in response to the middlebox sending the additional certificate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client computing device 202 and/or middlebox 204). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate verifying connection integrity. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as certificate 122 and/or certificate 124. Certificates 122 and 124 generally represent any type or form of electronic data that can be used to authenticate a computing device and/or a document modified by a computing device. In some embodiments, certificates 122 and/or 124 may represent public key certificates that include information about a computing device, a public key, and/or a digital signature of a signatory such as a certificate authority that verifies that the certificate is valid.

Example system 100 in FIG. 1 may be implemented in a variety of ways. For example, all or a portion of example system 100 may represent portions of example system 200 in FIG. 2. As shown in FIG. 2, system 200 may include a client computing device 202 in communication with a server 206 via a middlebox 204. In one example, all or a portion of the functionality of modules 102 may be performed by client computing device 202, middlebox 204, and/or any other suitable computing system. As will be described in greater detail below, one or more of modules 102 from FIG. 1 may, when executed by at least one processor of client computing device 202 and/or middlebox 204, enable client computing device 202 and/or middlebox 204 to verify connection integrity. For example, and as will be described in greater detail below, client connection module 104 may initiate, by client computing device 202, a connection to server 206 using a transport layer security protocol, where the connection is mediated by middlebox 204 that is capable of examining traffic between client computing device 202 and server 206 and middlebox connection module 106 may receive, by middlebox 204, a request from client computing device 202 to initiate a connection to server 206 via middlebox 204 using a transport layer security protocol. Next, client certificate module 108 may request, by client computing device 202, via a side protocol executing in parallel with the transport layer security protocol, certificate 122 for middlebox 204 that attests to the trustworthiness of the content and middlebox certificate module 110 may receive, by middlebox 204, from client computing device 202, via a side protocol executing in parallel with the transport layer security protocol, a request for a certificate 122 for middlebox 204 that attests to a trustworthiness of the content.

After receiving the request, middlebox certificate module 110 may send, by middlebox 204 to client computing device 202, via the side protocol executing in parallel with the transport layer security protocol, certificate 122 for middlebox 204. Client certificate module 108 may receive, by client computing device 202 from middlebox 204, via the side protocol executing in parallel with the transport layer security protocol, certificate 122 for middlebox 204 and may request, via the side protocol, in response to client computing device 202 determining that certificate 122 is not recognized as globally trusted by client computing device 202, certificate 124 from a device upstream of middlebox 204 that attests to the trustworthiness of the content. Middlebox certificate module 110 may receive, by middlebox 204, from client computing device 202, via the side protocol, a request for a certificate 124 from a device upstream of middlebox 204 that attests to the trustworthiness of the content. After receiving the request for certificate 124, middlebox certificate module 110 may request, by middlebox 204, from the device upstream of middlebox 204, via the side protocol, certificate 124 for the device upstream from middlebox 204, receive, by middlebox 204, from the device upstream of middlebox 204, via the side protocol, certificate 124 for the device upstream of middlebox 204 that attests to the trustworthiness of the content, and send, from middlebox 204 to client computing device 202, via the side protocol, certificate 124 for the device upstream from middlebox 204. Client certificate module 108 may receive, by client computing device 202 from the middlebox 204, via the side protocol, certificate 124.

After certificate 124 has been received, client connection module 104 may send data from client computing device 202 to server 206 via the connection using the transport layer security protocol in response to determining that certificate 124 is recognized as globally trusted by client computing device 202. Once client computing device 202 has begun sending data, middlebox connection module 106 may relay data from client computing device 202 to server 206, using the transport layer security protocol, via the connection that was validated by client computing device 202 in response to middlebox 204 sending certificate 124.

Client computing device 202 generally represents any type or form of computing device capable of reading computer-executable instructions. In some embodiments, client computing device 202 may be an end-user device such as a laptop or desktop. In some embodiments, client computing device 202 may be configured with an endpoint protection application that may request certificates from middleboxes. Additional examples of computing device 202 include, without limitation, tablets, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of sending and/or receiving data. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. In some embodiments, server 206 may represent a reverse proxy that forwards traffic to one or more additional servers.

Middlebox 204 generally represents any type or form of computing device that is capable of inspecting, filtering, and/or modifying network traffic. In some examples, middleboxes may be capable of decrypting encrypted data in order to inspect and/or modify the data. In some embodiments, middleboxes may intercept data, decrypt the data, examine and/or alter the data, re-encrypt the data, and then forward the data to the original destination. In some examples, middleboxes may be installed by network administrators in order to provide benefits to users of the network, such as improved security and/or speed. In some examples, middleboxes may filter data to comply with regulations, such as by eliminating illegal images. Examples of middlebox 204 may include, without limitation, firewalls, network address translators, intrusion detection systems, and/or network optimizers. In some embodiments, middlebox 204 may represent a physical device. In other embodiments, middlebox 204 may represent a virtualized middlebox hosted on a server.

Figure 3:
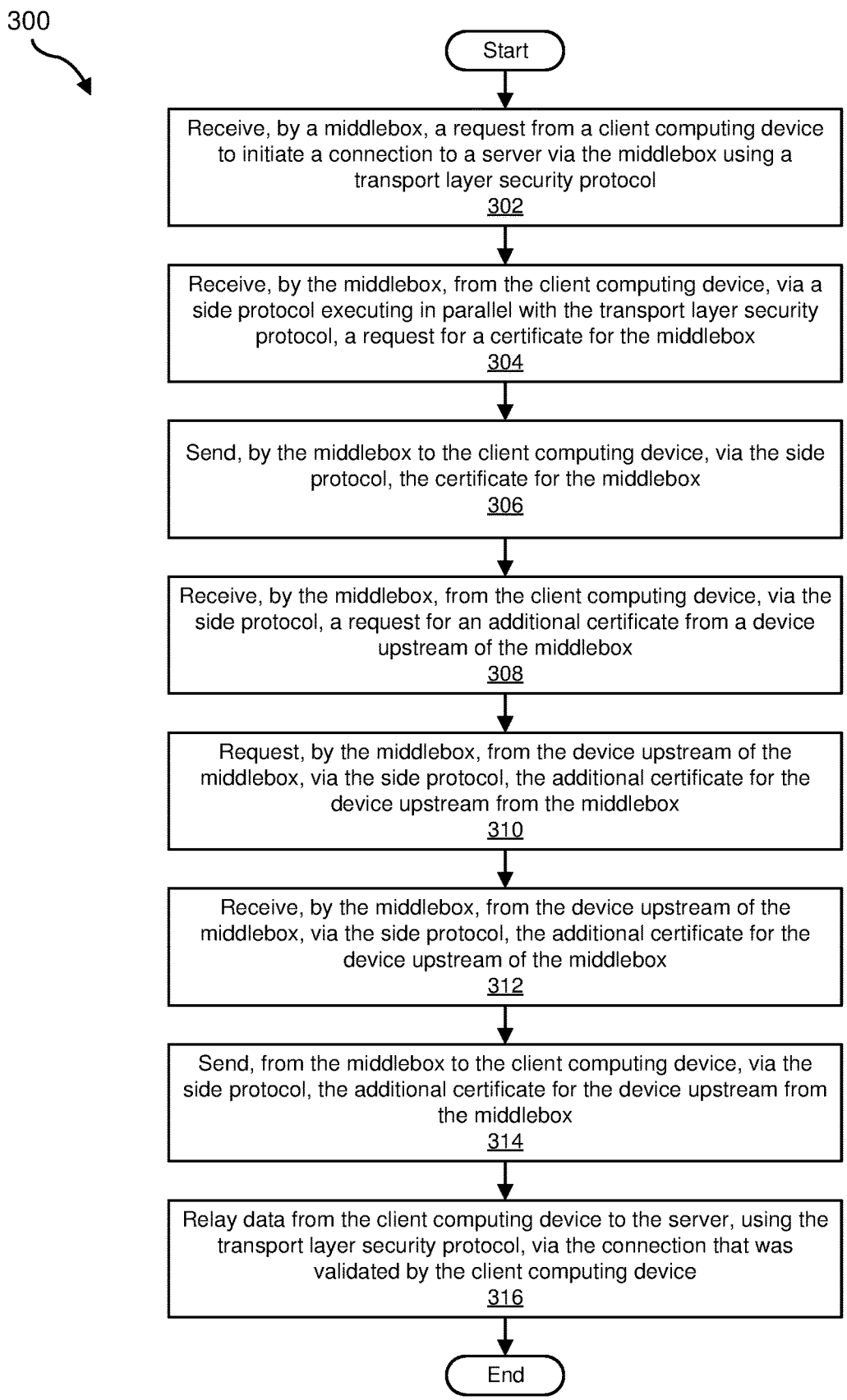
FIG. 3 is a flow diagram of an example method for verifying connection integrity.

FIG. 3 is a flow diagram of an example computer-implemented method 300 for verifying connection integrity from the perspective of a middlebox. FIG. 4 is a flow diagram of an example computer-implemented method 400 for verifying connection integrity from the perspective of a client computing device. The steps shown in FIG. 3 and/or FIG. 4 may be performed by any suitable computer-executable code and/or computing system, including system 100 in FIG. 1, system 200 in FIG. 2, and/or variations or combinations of one or more of the same. In one example, each of the steps shown in FIG. 3 and/or FIG. 4 may represent an algorithm whose structure includes and/or is represented by multiple sub-steps, examples of which will be provided in greater detail below.

As illustrated in FIG. 4, at step 402, one or more of the systems described herein may initiate, by a client computing device, a connection to a server using a transport layer security protocol, where the connection is mediated by at least one middlebox that is capable of examining traffic between the client computing device and the server. For example, client connection module 104 may initiate a connection to server 206 using a transport layer security protocol, where the connection is mediated by middlebox 204 that is capable of examining traffic between client computing device 202 and server 206.

The term "transport layer security protocol," as used herein, generally refers to any established protocol that provides encryption for communications over a network. In some embodiments, a transport layer security protocol may be an established standard that is in use by a large number of network-connected devices. Examples of transport layer security protocols may include, without limitation, any version of the Secure Sockets Layer (SSL) protocol, the Datagram Transport Layer Security (DTLS) protocol, and/or any version of the Transport Layer Security (TLS) protocol.

The term "connection," as used herein, general refers to any path of communication between to computing systems. For example, a connection may include a TLS session between a client and a server, between a client and a middlebox, and/or between a middlebox and a server. Additionally or alternatively, a connection may include a communication path between a client and a server that is mediated by one or more intermediate devices and that includes of a series of connections from one device to the next, starting with the client, progressing through one or more intermediate devices, and ending with the server. For example, the connection may include a series of TLS sessions (one TLS session between the client and a first intermediate device, another TLS session between the first intermediate device and the second intermediate device, and so on until reaching a TLS session between a final intermediate device and the server). Thus, the term "connection" may refer to a primary content flow and/or content path to be monitored as content flows between the server (e.g., the genuine server) to the end client. In some examples, the term "connection" may refer to a virtual connection that includes multiple connections established in multiple sessions connecting a server to a middlebox (and then, in some cases, middlebox-to-middlebox in a series of middleboxes) and eventually a middlebox to a client.

Client connection module 104 may initiate a connection in a variety of ways and/or contexts. For example, client connection module 104 may initiate a TLS handshake between a client and a server. In some embodiments, client connection module 104 may initiate a connection to a server by initiating a connection to a middlebox that may then, in turn, initiate a connection between the middlebox and the server. In some examples, client connection module 104 may initiate a connection that is composed of multiple separate sub-connections between the client and a first middlebox, the first middlebox and a second middlebox, and so forth, and then between a last middlebox and a server, all relaying traffic from the client to the server and vice versa. In some examples, client connection module 104 may initiate a connection over the Internet. In other examples, client connection module 104 may initiate a connection between two devices on a local network. In some examples, client connection module 104 may initiate a hypertext transfer protocol secure connection. For example, client connection module 104 may initiate a connection in response to a user opening a web page and/or loading a web resource in an Internet browser. In other examples, client connection module 104 may initiate other types of connections, including but not limited to file transfer protocol connections and/or simple mail transfer protocol connections.

A middlebox may mediate the connection between the client computing device and the server in a variety of ways. In some examples, the client computing device may initially not have visibility into any devices mediating the connection except for the middlebox that is directly upstream of the client computing device. For example, a client computing device that is initiating a connection that is mediated by two middleboxes before reaching the server may, via a transport layer security protocol, only communicate directly with the first middlebox upstream from the client computing device, not the second middlebox or the server. In some examples, a client computing device may be reliant on the first middlebox to perform security checks of additional devices involved in the connection. For example, if the first middlebox determines that the server is trustworthy, a transport layer security protocol alone may not enable the client computing device to make an independent determination about whether the server is trustworthy and may be forced to rely on the determination made by the middlebox, even if the middlebox has lower standards for trustworthiness than the client computing device does.

As illustrated in FIG. 3, at step 302, one or more of the systems described herein may receive, by a middlebox that is capable of examining traffic between a client computing device and a server, a request from the client computing device to initiate a connection to the server via the middlebox using a transport layer security protocol. For example, middlebox connection module may, as part of computing device in FIG. 2, receive, by middlebox 204 that is capable of examining traffic between client computing device 202 and server 206, a request from client computing device 202 to initiate a connection to server 206 via middlebox 204 using a transport layer security protocol.

Middlebox connection module 106 may receive the request to initiate a connection in a variety of contexts. For example, middlebox connection module 106 may be part of an intrusion detection system that intercepts all outgoing and/or incoming traffic to the client computing device. In another example, middlebox connection module 106 may be part of a parental control filter designed to prevent the client computing device from accessing inappropriate material.

In some examples, as will be explained in greater detail below, the request to initiate the connection to the server may instead result in a direct connection established with a middlebox and, thus, only an indirect, virtual, and/or mediated connection with the server.

Returning to FIG. 4, at step 404, one or more of the systems described herein may request, by the client computing device, via a side protocol executing in parallel with the transport layer security protocol, a certificate for the middlebox that attests to the trustworthiness of the content. For example, client certificate module 108 may request, by client computing device 202, via a side protocol executing in parallel with the transport layer security protocol, certificate 122 for middlebox 204 that attests to the trustworthiness of the content.

The term "side protocol," as used herein, generally refers to any communication channel between devices on a network that is not part of a transport layer security protocol. In some embodiments, a side protocol may not be a codified standard and/or may not be widely implemented. For example, a side protocol may be a protocol used for communication between devices configured with security applications distributed by the same vendor. In some examples, a side protocol may be implemented in a different library, module, process, and/or executable file from a transport layer security protocol. Additionally or alternatively, a transport layer protocol may be designed without regard to a side protocol and may therefore operate independently of the side protocol; however, the side protocol may be designed to operate in concert with the existing transport layer security protocol. In some embodiments, a side protocol may execute in parallel to a transport layer security protocol. In some examples, a device that is communicating with another device using a transport layer security protocol may simultaneously be sending messages to the other device using the side protocol. In some embodiments, a side protocol may provide information to an end user, an administrator, and/or security vendor regarding the operation of a transport layer protocol and/or may allow, delay, or interfere with the operation of a transport layer protocol based on information gathered by the side protocol. In some embodiments, a side protocol may use a specified port and/or may use a different port than a transport layer security protocol.

The term "certificate," as used herein, generally refers to any type or form of electronic data that can be used to authenticate a computing device and/or a document modified by a computing device. In some embodiments, a certificate may be a public key certificate with an associated key that can be used to sign documents. In some examples, a certificate may be issued by a certificate authority that is globally trusted and/or may be chained to a certificate issued by a globally trusted certificate authority. In some examples, a certificate may be globally trusted if the certificate is issued by an organization that is trusted by default by operating systems and/or browsers. For example, a certificate may be issued by SYMANTEC or GODADDY. In other examples, a certificate may be issued by a locally trusted certificate authority that is not globally trusted and/or may be chained to a certificate issued by a locally trusted authority that is not globally trusted. For example, a client computing device may host a local trust store that is configured to trust certificates issued by the organization that operates the client computing device. In this example, the client computing device may determine that a certificate issued by the organization and/or chained to a certificate issued by the organization is locally trusted. In some embodiments, the certificate for the middlebox may be a dynamically generated certificate that identifies the middlebox as being the server. For example, a middlebox that intercepts a connection aimed at a SYMANTEC server may dynamically generate a certificate that identifies the middlebox as the SYMANTEC server but is issued by a locally trusted certificate authority rather than being issued by a globally trusted authority as a legitimate certificate for a SYMANTEC server would be. In some embodiments, a certificate may attest to the trustworthiness of content by attesting to the trustworthiness of the devices transmitting and/or relaying the content.

Client certificate module 108 may request a certificate from the middlebox in a variety of contexts. In some embodiments, client certificate module 108 may request a certificate every time the client computing device initiates a new connection. In other embodiments, client certificate module 108 may request a certificate only when the client computing device initiates a secure connection (i.e., one using a transport layer security protocol). In some embodiments, client certificate module 108 may not initially have visibility into the devices that make up the connection to the server and may request a certificate from the nearest upstream device without having information about whether the nearest upstream device is the server or a middlebox. In some examples, client certificate module 108 may request a certificate in order to verify that the connection between the client computing device and the server is secure and/or trustworthy. In some embodiments, the client computing device may be configured to avoid sending data over connections that are not trustworthy and therefore may request a certificate in order to determine whether to send data over a connection.

Returning to FIG. 3, at step 304, one or more of the systems described herein may receive, by the middlebox, from the client computing device, via a side protocol executing in parallel with the transport layer security protocol, a request for a certificate for the middlebox that attests to a trustworthiness of the content. For example, middlebox certificate module 110 may, as part of computing device in FIG. 2, receive, by middlebox 204, from client computing device 202, via a side protocol executing in parallel with the transport layer security protocol, a request for certificate 122 for middlebox 204 that attests to a trustworthiness of the content.

Middlebox certificate module 110 may receive the request for the certificate in a variety of contexts. For example, middlebox certificate module 110 may receive the request for the certificate at the same time as middlebox connection module 106 receives the request to initiate a transport layer security protocol connection. In some embodiments, middlebox certificate module 110 may receive a request that is not asking specifically for a certificate for the middlebox but rather for a certificate for whatever device is the next upstream device from the client computing device that sent the request, whether the next upstream device is a middlebox or a server.

At step 306, one or more of the systems described herein may send, by the middlebox to the client computing device, via the side protocol executing in parallel with the transport layer security protocol, the certificate for the middlebox. For example, middlebox certificate module 110 may, as part of computing device in FIG. 2, send, by middlebox 204 to client computing device 202, via the side protocol executing in parallel with the transport layer security protocol, certificate 122 for middlebox 204.

Middlebox certificate module 110 may send the certificate to the client in a variety of contexts. For example, middlebox certificate module 110 may dynamically generate the certificate based on the server to which the client computing device is attempting to connect and may then send the dynamically generated certificate to the client. In another example, middlebox certificate module 110 may store a cached copy of a certificate to be sent to the client computing device. For example, if client computing devices regularly initiate connections to a particular server via the middlebox, the middlebox may store a copy of a dynamically generated certificate that represents the middlebox as the server. In some embodiments, middlebox certificate module 110 may dynamically generate a certificate that impersonates a server certificate in order to enable the client computing device to examine the certificate and make determinations about the security and/or trustworthiness of the content to the server.

Returning to FIG. 4, at step 406, one or more of the systems described herein may receive, by the client computing device from the middlebox, via the side protocol executing in parallel with the transport layer security protocol, the certificate for the middlebox. For example, client certificate module 108 may receive, by client computing device 202 from middlebox 204, via the side protocol executing in parallel with the transport layer security protocol, certificate 122 for middlebox 204.

Client certificate module 108 may perform a variety of actions upon receiving the certificate. For example, client certificate module 108 may analyze the certificate to determine whether the certificate was issued by a globally trusted authority. In some embodiments, client certificate module 108 may store a copy of the certificate and/or a representation of the certificate for later reference.

Returning to FIG. 4, at step 408, one or more of the systems described herein may request, by the client computing device, via the side protocol, in response to the client computing device determining that the certificate is not recognized as globally trusted, an additional certificate from a device upstream of the middlebox. For example, client certificate module 108 may request, by client computing device 202, via the side protocol, in response to client computing device 202 determining that certificate 122 is not recognized as globally trusted, certificate 124 from a device upstream of middlebox 204.

Client certificate module 108 may request an additional certificate in a variety of contexts. In some embodiments, client certificate module 108 may not have visibility into what devices are part of the connection beyond the initial middlebox and the server and may request a certificate from the next upstream device without having information about whether the next upstream device is a server or another middlebox. In some embodiments, client certificate module 108 may request an additional certificate upon determining that the first certificate does not identify a server.

In some embodiments, client certificate module 108 may examine the first certificate to determine whether the certificate was issued by a trusted authority. In one embodiment, client certificate module 108 may determine that the certificate is not recognized as globally trusted if the certificate is not issued by and/or chained to a globally trusted authority even if the certificate is issued by and/or chained to a locally trusted authority. In some examples, client certificate module 108 may determine whether a certificate is issued by and/or chained to a globally trusted authority by checking a list of globally trusted certificate authorities. In some embodiments, a certificate may be recognized as globally trusted if the certificate is issued by and/or chained to an authority that has authority beyond a local trust store. Thus, as used herein, the term "globally trusted" may refer to any basis of trust that exists outside of and/or is independent of a basis of trust that is used to establish communication via the transport layer security protocol.

In some embodiments, the client computing device may request certificates until the client computing device determines that the client computing device has received a globally trusted certificate (e.g., a certificate that is chained to a globally trusted root) and then may stop requesting certificates (and may begin sending data), regardless of whether the globally trusted certificate is from the server. In one embodiment, the client computing device may request certificates until the client computing device determines that the client computing device has received a certificate from the server, regardless of whether the client receives, from a device downstream of the server, a globally trusted certificate (e.g., that is chained to a globally trusted root) but is not from a server. In some embodiments, the client computing device may only trust a server certificate that is chained to a globally trusted root. Additionally or alternatively, the client computing device may trust a certificate under some other predetermined set of conditions that does not require the certificate to belong to a server or to be chained to a globally trusted root. For example, the client computing device may recognize as globally trusted a certificate issued by a certificate authority that meets a predetermined threshold for trustworthiness but that is not on a list of globally trusted roots. In some examples, the client computing device may recognize a certificate received from a middlebox as globally trusted based on the certificate pertaining to the middlebox and the client recognizing the middlebox as trusted.

Client certificate module 108 may initiate a connection to the middlebox via the side protocol in a variety of ways. In one embodiment, client certificate module 108 may send a request via an additional connection established using the transport layer security protocol that includes a signifier that indicates that the client computing device is attempting to initiate a connection via the side protocol. For example, client certificate module 108 may send a special hypertext transfer protocol secure GET request with a magic number, addressed to the same server as the original request. In this embodiment, the middlebox, when parsing the GET request, may recognize that the client computing device is attempting to initiate the side protocol. In some examples, each middlebox may then initiate a connection with the next upstream middlebox via the same mechanism.

Additionally or alternatively, client certificate module 108 may send a message via the main transport layer security protocol connection using a transport layer security protocol extension. In this embodiment, this extension may only be acknowledged on the connection segments between middleboxes and/or middlebox-aware clients and/or servers. For each such segment, the systems described herein may provide information about where to connect to open a side channel for the side protocol. In some embodiments, the systems described herein may use the extension to negotiate the fact that there is a middlebox-aware entity on both ends of the connection and then may add the actual contact information in a message sent after the encrypted connection is established. In some examples, the systems described herein may carry out the above process immediately after a transport layer security protocol handshake, before any data from the client computing device or server is forwarded over the connection.

Returning to FIG. 3, at step 308, one or more of the systems described herein may receive, by the middlebox, from the client computing device, via the side protocol, a request for an additional certificate from a device upstream of the middlebox that attests to the trustworthiness of the content. For example, middlebox certificate module 110 may, as part of computing device in FIG. 2, receive, by middlebox 204, from client computing device 202, via the side protocol, a request for certificate 124 from a device upstream of middlebox 204 that attests to the trustworthiness of the content.

The term "upstream," as used herein, generally refers to any device that is closer to a server than another device that is part of the same connection (e.g., fewer hops away from the server in the connection). For example, the first middlebox is upstream of the client computing device. If there is a second middlebox that handles traffic after the first middlebox has handled the traffic and before the server has received the traffic, the second middlebox is upstream from the first middlebox. In some examples, the device upstream of the middlebox may be the server itself.

Middlebox certificate module 110 may receive the request for the additional certificate in a variety of ways. For example, middlebox certificate module 110 may receive a certificate request that includes information indicating that the requesting device has already received a certificate from the middlebox and is now requesting a certificate from the next upstream device. In some embodiments, middlebox certificate module 110 may receive a request for a certificate, determine that a certificate for the middlebox has already been sent to the requesting device, and determine that therefore the request is for an additional certificate.

At step 310, one or more of the systems described herein may request, by the middlebox, from the device upstream of the middlebox, via the side protocol, the additional certificate for the device upstream from the middlebox. For example, middlebox certificate module 110 may, as part of computing device in FIG. 2, request, by middlebox 204, from the device upstream of middlebox 204, via the side protocol, certificate 124 for the device upstream from middlebox 204.

Middlebox certificate module 110 may request a certificate for a device upstream of the middlebox in a variety of ways. In some embodiments, middlebox certificate module 110 may only have direct communications with the next device immediately upstream of the middlebox and may route requests for certificates for any upstream devices through the next upstream device. In one embodiment, middlebox certificate module 110 may, after receiving a request for an additional certificate, query the device immediately upstream of the middlebox for a certificate identifying the device even if there are several upstream devices between the middlebox and the server. In some examples, middlebox certificate module 110 may request, receive, and/or send multiple certificates. In one example, middlebox certificate module 110 may request, by the middlebox, from devices upstream of the middlebox, via the side protocol, additional certificates for the devices upstream from the middlebox, receive, by the middlebox, from the devices upstream of the middlebox, via the side protocol, the additional certificates for the device upstream of the middlebox that can attest to the trustworthiness of the content, and send, from the middlebox to the client computing device, via the side protocol, the additional certificates for the devices.

In some examples, middlebox certificate module 110 may store a cached copy of a certificate for one or more upstream devices and may retrieve the cached copy of the certificate rather than querying any other devices for the certificate. In some embodiments, if a client computing device—whether the same client computing device that is currently initiating a connection, or a different client computing device that also routes traffic via the middlebox—has recently and/or repeatedly made a connection to the server, middlebox certificate module 110 may store cached copies of certificates for each upstream device in the connection. In some embodiments, middlebox certificate module 110 may tie storage of cached certificates to a session identifier and/or may expire cached certificates after a predetermined time limit. In some embodiments, if middlebox certificate module 110 has a cached copy of a certificate for the server, middlebox certificate module 110 may send the certificate for the server to the client when initially queried by the client for a certificate.

At step 312, one or more of the systems described herein may receive, by the middlebox, from the device upstream of the middlebox, via the side protocol, the additional certificate for the device upstream of the middlebox that attests to the trustworthiness of the content. For example, middlebox certificate module 110 may, as part of computing device in FIG. 2, receive, by middlebox 204, from the device upstream of middlebox 204, via the side protocol, certificate 124 for the device upstream of middlebox 204 that attests to the trustworthiness of the content.

Middlebox certificate module 110 may perform a variety of actions after receiving the certificate from the upstream device. In some examples, middlebox certificate module 110 may immediately forward the certificate to the client computing device. In other examples, middlebox certificate module 110 may examine the certificate to determine whether the certificate is trusted and/or valid. In some embodiments, middlebox certificate module 110 may create a cached copy of the certificate for later use.

At step 314, one or more of the systems described herein may send, from the middlebox to the client computing device, via the side protocol, the additional certificate for the device upstream from the middlebox. For example, middlebox certificate module 110 may, as part of computing device in FIG. 2, send, from middlebox 204 to client computing device 202, via the side protocol, certificate 124 for the device upstream from middlebox 204.

Middlebox certificate module 110 may send the certificate for the upstream device to the client computing device in a variety of ways. In some examples, middlebox certificate module 110 may send a message that includes only the certificate. In other examples, middlebox certificate module 110 may send a message that includes additional information about the upstream device and/or the connection.

Returning to FIG. 4, at step 410, one or more of the systems described herein may receive, by the client computing device from the middlebox, via the side protocol, the additional certificate for the device upstream from the middlebox. For example, client certificate module 108 may receive, by client computing device 202 from middlebox 204, via the side protocol, certificate 124 for the device upstream from middlebox 204.

Client certificate module 108 may perform a variety of actions after receiving the certificate for the upstream device. For example, client certificate module 108 may examine the certificate to determine whether the certificate is trusted. In some examples, client certificate module 108 may determine that the additional certificate for the device upstream from the middlebox is recognized as globally trusted by determining that the additional certificate is chained to a globally trusted root certificate. In other examples, client certificate module 108 may determine that the certificate for the upstream device is not trusted and may request an additional certificate from the next upstream device.

In one embodiment, the client computing device may request, from the middlebox, via the side protocol, a certificate for a device immediately upstream of the middlebox, receive, from the middlebox, via the side protocol, the certificate for the device immediately upstream of the middlebox, and continue to request, from the middlebox, via the side protocol, a certificate for each successive device immediately upstream from a most recent device for which the client computing device has received a certificate until the client computing device receives a certificate that is recognized as globally trusted by the client computing device. For example, as illustrated in FIG. 5, the connection between a client computing device 502 and a server 510 may be mediated by middleboxes 504, 506, and/or 508. In this example, client computing device 502 may first request a certificate from middlebox 504 and middlebox 504 may send certificate 514 to client computing device 502. Client computing device 502 may determine that certificate 514 is not trusted and may request a certificate for the next device upstream from middlebox 504. In response, middlebox 504 may query middlebox 506 for a certificate and middlebox 506 may send certificate 516 to middlebox 504, which may then forward certificate 516 to client computing device 502.

In some examples, client computing device 502 may examine certificate 516, determine that certificate 516 is not globally trusted, and request, from middlebox 504, a certificate for the next device upstream from middlebox 506. Middlebox 504 may relay the request to middlebox 506, which may request a certificate from middlebox 508. Middlebox 508 may send certificate 518 to middlebox 506, which may forward certificate 518 to middlebox 504, which may forward certificate 518 to client computing device 502.

In one example, client computing device 502 may examine certificate 518, determine that certificate 518 is not globally trusted, and request, from middlebox 504, a certificate for the next device upstream from middlebox 508. Middlebox 504 may relay the request to middlebox 506, which may relay the request to middlebox 508, which may request a certificate from server 510. Server 510 may send certificate 520 to middlebox 508, which may forward certificate 520 to middlebox 506, which may forward certificate 520 to middlebox 504, which may forward certificate 520 to client computing device 502. Client computing device 502 may examine certificate 520 and determine that certificate 520 is a globally trusted certificate. Client computing device 502 may then begin sending data to server 506, via middleboxes 504, 506, and 508, using a transport layer security protocol.

In some embodiments, client computing device 502 may store copies and/or representations of certificates 514, 516, 518, and/or 520 for later reference. By collecting a certificate from each middlebox involved in the connection, client computing device 502 may gain visibility into the entire chain of devices, rather than only having information about middlebox 504.

In some embodiments, middlebox 504 may store cached copies of certificates 516, 518, and/or 520. In these embodiments, middlebox 504 may immediately return one or all of the certificates the next time middlebox 504 is queried by a client computing device about certificates for upstream devices.

In one embodiment, client computing device 502 may continue to request the certificate for each successive device until the client computing device 502 receives a certificate for server 510, regardless of whether any intervening certificates are trusted. In other embodiments, client computing device 502 may stop querying for additional certificates as soon as client computing device 502 determines that a certificate is trusted. For example, if client computing device 502 determines that certificate 516 is trusted, client computing device 502 may not query middlebox 504 for certificates 518 and/or 520.

From the perspective of the middlebox, in some examples, middlebox certificate module 110 may receive, from the client computing device, via the side protocol, a request for a certificate for each successive device immediately upstream from a most recent device for which the middlebox has sent a certificate until the client computing device receives a certificate from the middlebox that is recognized as globally trusted by the client computing device. In these examples, middlebox certificate module 110 may send, from the middlebox to the client computing device, via the side protocol, the certificate for each successive device immediately upstream from the most recent device for which the middlebox has sent a certificate until the client computing device receives the certificate from the middlebox that is recognized as globally trusted by the client computing device.

Returning to FIG. 4, at step 412, one or more of the systems described herein may send data from the client computing device to the server via the connection using the transport layer security protocol in response to determining that the additional certificate for the device upstream from the middlebox is recognized as globally trusted. For example, client connection module 104 may send data from client computing device 202 to server 206 via the connection using the transport layer security protocol in response to determining that certificate 124 for the device upstream from middlebox 204 is recognized as globally trusted.

Client connection module 104 may send various types of data via the connection. In some examples, client connection module 104 may send data that includes a request for data from the server. For example, client connection module 104 may send a request for a web page. In other examples, client connection module 104 may send data that represents files.

Returning to FIG. 3, at step 316, one or more of the systems described herein may relay data from the client computing device to the server, using the transport layer security protocol, via the connection that was validated by the client computing device in response to the middlebox sending the additional certificate. For example, middlebox connection module 106 may, as part of computing device in FIG. 2, relay data from client computing device 202 to server 206, using the transport layer security protocol, via the connection that was validated by client computing device 202 in response to middlebox 204 sending certificate 124.

Middlebox connection module 106 may perform a variety of functions in addition to relaying the data. For example, middlebox connection module 106 may inspect the data to ensure that the data complies with governmental and/or organizational regulations and/or parental control policies. In some embodiments, middlebox connection module 106 may alter data sent from and/or received by the client computing device. For example, middlebox connection module 106 may remove malicious content from the data. In another example, middlebox connection module 106 may add content to the data, such as warnings that the data may potentially container malicious content. In some embodiments, middlebox connection module 106 may decrypt the data in order to inspect and/or alter the data. In these embodiments, middlebox connection module 106 may re-encrypt the data before forwarding the data.

In some embodiments, the middlebox may receive, via the connection, using transport layer security protocol, from an upstream device, data originating from the server and bound for the client computing device. In some embodiments, the middlebox may receive, via the side protocol, from the upstream device, a manifest that describes the data sent using the transport layer security protocol. In some examples, the middlebox may receive the data and the manifest that describes the data simultaneously. The manifest may describe the data in a variety of ways. In some embodiments, the manifest may include hashes corresponding to portions of the data. In some examples, the middlebox may alter the data bound for the client computing device. Thus, in some examples, the client may receive altered data rather than the original data sent by the server. The altered data may differ from the original data in any of a variety of ways. For example, the altered data may represent a sanitized version of the original data (e.g., where potential threats and/or content deemed inappropriate have been removed from the original data). Additionally or alternatively, the altered data may include additional content providing additional information and/or features within a document. In these various examples, the middlebox may create a new manifest that describes the altered data (e.g., that describes how the altered data differs from the original data and/or how the altered data differs from one or more versions of the data previously altered by one or more upstream middleboxes) and may sign the new manifest that describes the altered data with a key corresponding to the certificate for the middlebox. In some embodiments, the middlebox may create an entirely new manifest file, while in other embodiments, the middlebox may create the new manifest by updating the existing manifest to reflect the modified data. For example, the middlebox may add an addendum to the existing manifest describing any data added, modified, or removed by the middlebox. In some examples, the middlebox may then send the altered data to the client computing device via the connection, using transport layer security protocol, while also sending the new manifest that describes the altered data to the client computing device via the side protocol. In some embodiments, the new manifest may describe the entirety of the altered data, while in other embodiments, the new manifest may describe only the changes made to the data by the middlebox. In one embodiment, the middlebox may send all versions of the data—the original version, the modified version created by the middlebox, and/or any additional modified versions created by other middleboxes—to the client.

In some embodiments, the middlebox may record additional information in the manifest about the alterations to the data. For example, the middlebox may record a reason for altering the data, such as, "complying with organizational policy," "removed potentially malicious code," and/or "optimized due to bandwidth restrictions." In some embodiments, a middlebox may record specific information about malicious code removed by the middlebox, such as a name and/or signature of a piece of malware. For example, the middlebox may record in the manifest, "item 37 of data removed due to heuristic similarity to malicious toaster virus." In one embodiment, the middlebox may send the manifest describing the data to the client computing device and may await a response from the client computing device before sending the data itself. For example, if the middlebox has determined that the data is malicious, the middlebox may send a manifest summarizing the data and describing the data as malicious to the client computing device so that an endpoint protection application on the client computing device may analyze the manifest and determine whether to request the potentially malicious data.

In some embodiment, each middlebox may also include in the manifest a signature on the public key of the next middlebox that will receive the data. In this embodiment, a mutual authentication system may exist between each middlebox and the immediately upstream and/or downstream middleboxes.

From the client computing device's perspective, the client computing device may receive, via the connection using the transport layer security protocol, data from the server while also receiving, via the side protocol, a manifest describing alterations made to the data by the middlebox. In some examples, the client computing device may receive manifests from multiple middleboxes that have made alterations to the data. In one embodiment, the client computing device may use the previously-received certificates for the middleboxes to identify which alterations were made by which middlebox by matching up the public keys used to sign the manifests with the certificates for the middleboxes.

In some examples, the client computing device may display a notification to a user of the client computing device indicating that the data from the server was altered by the middlebox. In some embodiments, the client computing device may display the notification using a different communication channel than the communication channel used to display the data. In one example, the data may be a web page displayed in a browser window and the client computing device may display the notification via a dialogue box outside the browser window.

In some examples, the client computing device may receive a manifest that does not accurately describe the data received by the client computing device. In one embodiment, the client computing device may send a new request to the server asking for another copy of the data. In some embodiments, the client computing device may display a notification to the user that the data has been tampered with. Additionally or alternatively, the client computing device may quarantine the data and/or may attempt to determine if the altered data is malicious.

In some embodiments, a middlebox may receive a request for a certificate from a server rather than or in addition to receiving a request for a certificate from a client computing device. In some examples, a server may request a certificate from the middlebox immediately downstream of the server. In one embodiment, a middlebox may receive, from the server, via the side protocol executing in parallel with the transport layer security protocol, a request for a certificate for the middlebox that attests to the trustworthiness of the content and may send to the server, via the side protocol executing in parallel with the transport layer security protocol, the certificate. In some examples, the server may continue requesting certificates until the server receives a certificate that the server determines is trusted and/or until the server receives a certificate from the client. In these examples, the middlebox may request and relay certificates from middleboxes further downstream and/or from the client computing device.

In some embodiments, a middlebox may examine a certificate for the client to determine whether the client is trustworthy before forwarding data from the client to the server. For example, the middlebox may examine the certificate for the client and may also examine other data about the client to determine whether the certificate accurately describes the client. In one example, the middlebox may determine that the certificate claims that the client is a security camera but other information about the client reveals that the client is a laptop. In this example, the middlebox may decline to relay data from the client to the server and/or may serve the client a cached version of data from the server that is cached on the middlebox. In another example, the middlebox may send the data from the client to the server but may first modify the data, for example by removing malicious code. In some embodiments, if the middlebox is modifying data sent from the client to the server, the middlebox may create a signed manifest describing any alterations made to the data. In some embodiments, the middlebox may send the signed manifest to the server using the side protocol. In some examples, the middlebox may simultaneously send the altered data to the server via the transport layer security protocol while sending the manifest describing the altered data to the server via the side protocol.

In some embodiments, the systems and methods described herein may implement a protocol (referred to, in one embodiment, as the Enhanced Middlebox Protocol (EMP)). EMP may be implemented in a variety of ways.

In some embodiments, all EMP communications may occur over mutually authenticated TLS sessions. In other embodiments, EMP may be built atop a wide range of other protocols. In embodiments where EMP is not built atop a mutually authenticated transport layer security protocol, then all communications between participants may be cryptographically signed by the sender. In some examples, the systems described herein may send a certificate by sending the certificate, the certificate's root, and/or the entire chain of intermediate roots. In other examples, the client and/or server may have mutually agreed upon adequate intermediaries. In some embodiments, clients may not trust content unless signed by servers and/or middleboxes that the client trusts.

Figure 6:
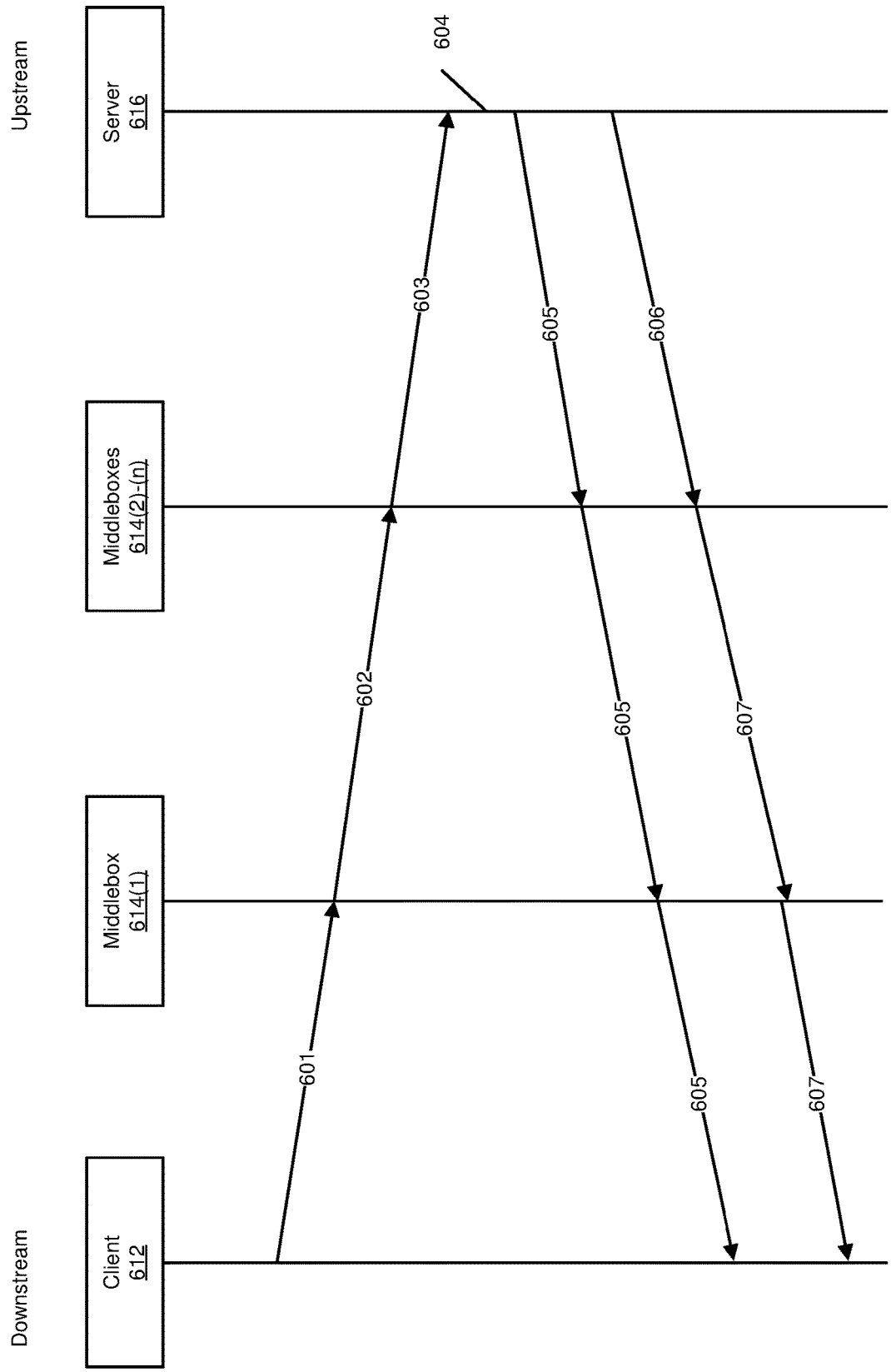
FIG. 6 is a block diagram of an example protocol for verifying connection integrity.

In one embodiment, as illustrated in FIG. 6, a client 612 may communicate with a server 616 via a middlebox 614(1) and/or middleboxes 614(2)-(n). At step 601, client 612 may receive a certificate for server 616 during connection setup for TLS and may evaluate that certificate. If the certificate chains up to a globally trusted root, then the client 612 may not initiate EMP. If the certificate is trusted by client 612 but does not chain to a globally trusted root, client 612 may initiate EMP. In some examples, the certificate may not chain to a globally trusted root because the certificate may be a surrogate certificate synthesized by middlebox 614(1). In some embodiments, at this point in time client 612 may buffer all TLS content received and/or may not provide the TLS content to any applications and/or other code on client 612.

In some examples, at step 602, if the next upstream middlebox 614(1) has a certificate claiming to represent server 616 and chaining to a globally trusted root, then middlebox 614(1) may return that certificate and/or that certificate's chain. If middlebox 614(1) does not have such a certificate, then middlebox 614(1) may request such a certificate from the next middlebox yet further upstream (i.e., middlebox 614(2)). In some examples, at step 603, the next upstream middlebox may behave in the same way as middlebox 614(1), as described above, and so forth, until the middlebox directly downstream of the server (i.e., middlebox 614(n)) requests a certificate from the server. In one example, step 604, an EMP request may reach server 616 for server 616 to return the genuine server certificate that chains to a globally trusted root.

In some examples, at step 605, each middlebox 614(n) through 614(1) in turn may cascade the genuine server certificate back to the next downstream middlebox, simply responding to the outstanding request, which collectively may eventually cascade the globally trusted (genuine) certificate for server 616 to client 612.

In one embodiment, at step 606, once server 616 and middlebox 614(n) have established the primary TLS session for flow of content intended for client 612, server 616 may start transmitting such content in such primary TLS session(s). In some examples, in parallel, server 616 may transmit a manifest of all content included in such primary session(s). In some examples, this manifest may be signed by server 616, and that signature may cover all content in such primary sessions. In one embodiment, for full security, this signature may also cover the public key of the TLS client whom server 616 believes is terminating that most upstream TLS session, although this may require mutual authentication of the primary TLS session(s) and therefore may carry considerable performance impact. In some embodiments, this second phase of the protocol may be focused on integrity protection and may run asynchronously regarding the setup phase. In some examples, server 616 may start transmitting content and/or digests to middleboxes 614(1)-(n) before client 612 has evaluated any certificates.

In some embodiments, at step 607, each middlebox 614(1)-(n) may inspect the content of the primary TLS session(s). If a middlebox wishes to change the contents of any primary TLS sessions, that middlebox may do so but may also create and sign a modified manifest including the original manifest, unaltered, along with either the new manifest and/or any line item modifications to the original manifest. As with servers, middleboxes may sign a manifest including the public key of the client terminating the immediately downstream connection. Each middlebox may then cascade the manifests to the downstream middleboxes and eventually client 612.

Figure 7:
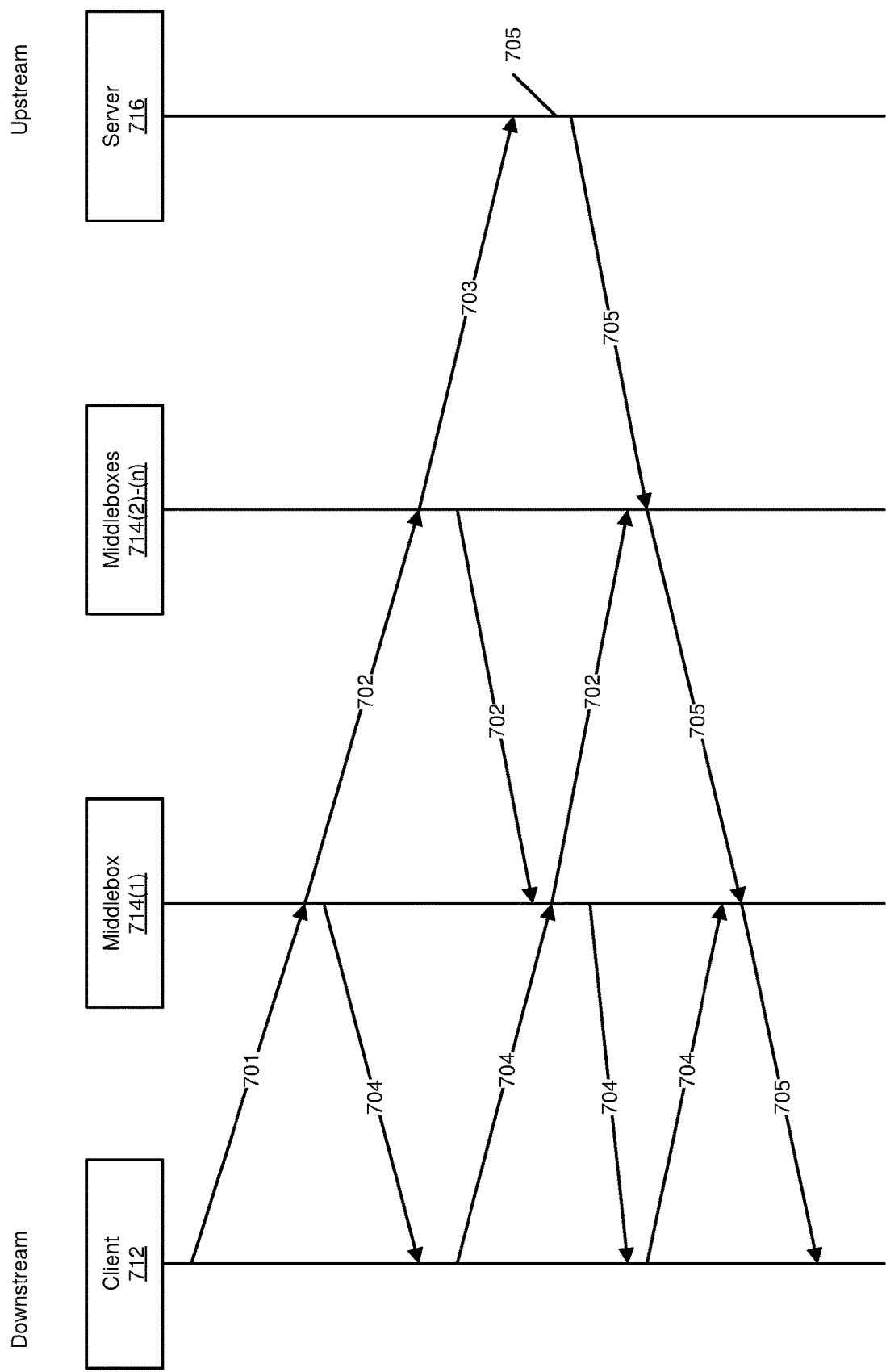
FIG. 7 is a block diagram of an example protocol with a simple implementation for verifying connection integrity.

In some embodiments, as illustrated in FIG. 7, a client 712 may communicate with a server 716 via middleboxes 714(1)-714(n). In one embodiment, a simple implementation may have the advantage of middleboxes 714(1)-(n) not needing to know or predict whether or not client 706 will recognize a given certificate as globally trusted.

In one embodiment, at step 701, client 712, upon receiving any server certificate in connection setup for a primary TLS session, may evaluate that certificate. If the server certificate chains to a globally trusted root, then client 712 may not initiate EMP. If the server certificate is trusted by client 712 but does not chain to a globally trusted root (e.g., because the alleged server certificate is a surrogate produced by middlebox 714(1)), then client 712 may initiate EMP. At this point, client 712 may buffer all TLS content received and/or may not provide the TLS content to any applications or other code on client 712 machine.

In some embodiments, at step 702, on receiving a certificate request from a downstream participant, if the adjacent upstream middlebox (i.e., middlebox 714(1)) has a certificate from yet further upstream claiming to represent server 716 for this primary TLS session, and that certificate has not yet been sent to client 712 for this primary TLS session, then that middlebox may return that upstream certificate by sending the certificate to client 712, or the nearest next downstream middlebox en route to client 712. If that certificate does not chain to a globally trusted root, then this middlebox may also request the next certificate yet further upstream since the certificate most recently provided to client 712 will not fully satisfy client 712, although in some embodiments client 712 may need to collect the certificates from each of middleboxes 714(1)-(n) in turn, without skipping any. In some examples, at step 703, each of the next middleboxes upstream may behave as the previous middlebox.

In one example, at step 704, anytime client 712 receives a certificate for any server in connection setup for a primary TLS session, client 712 may evaluate that certificate. If the server certificate chains up to a globally trusted root, then client 712 may determine that it has the genuine server certificate and is ready to receive manifests for content in the primary TLS session. In some examples, client 712 may also determine that client 712 is ready to begin verifying signatures in manifests for that content before trusting the content. If the server certificate is trusted by client 712 but does not chain to a globally trusted root, then client 712 may request the next certificate yet further upstream from the most recently received certificate.

In some examples, at step 705, an EMP-based certificate request may reach server 716 for server 716 to return the genuine server certificate that chains to a globally trusted root. Each middlebox 714(n) through 714(1) in turn may cascade that genuine server certificate back to the next downstream middlebox, which may eventually cascade the globally trusted (genuine) server certificate to client 712, simply by each middlebox responding to the outstanding request for such a certificate.

Figure 8:
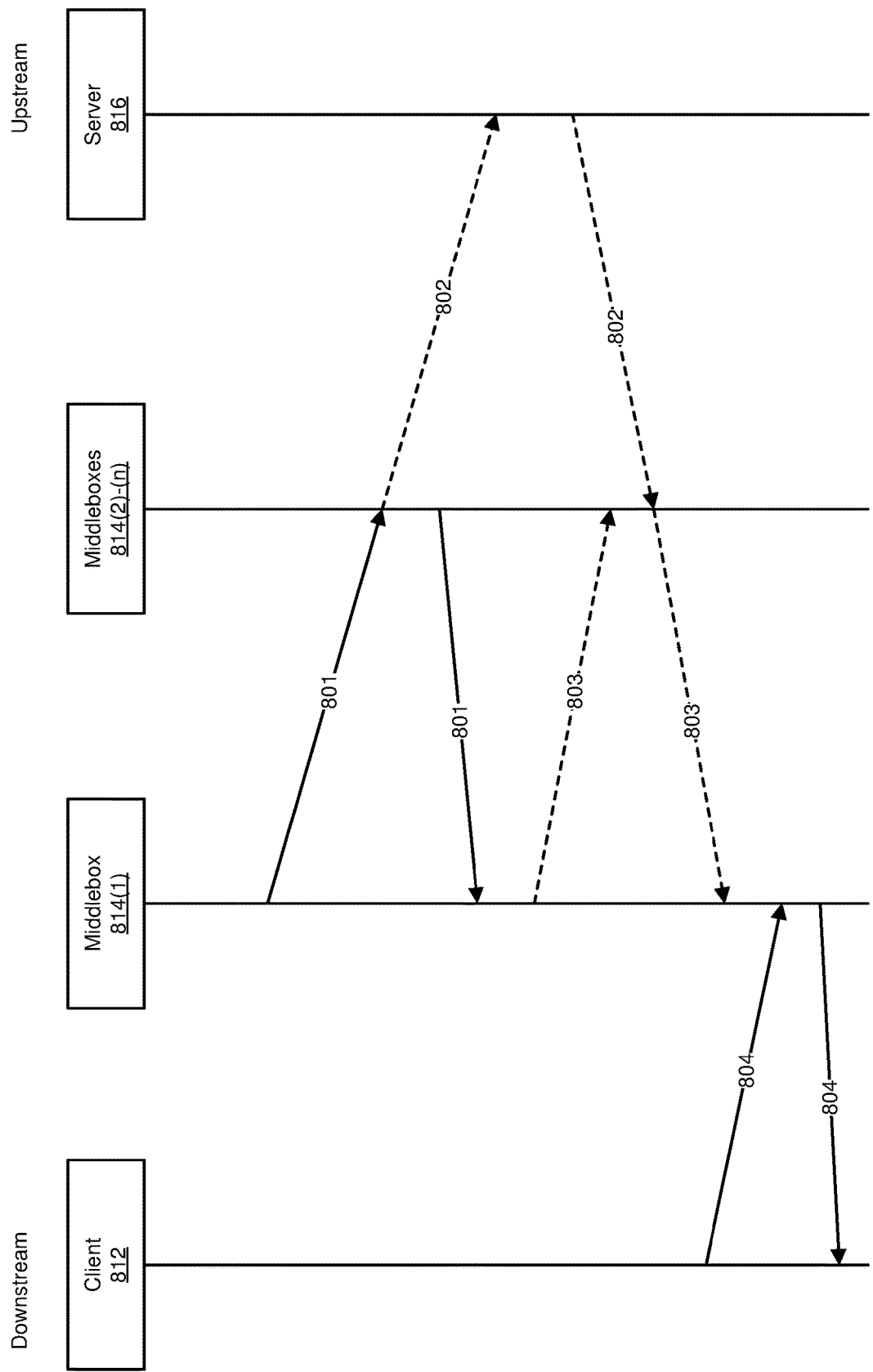
FIG. 8 is a block diagram of an example protocol for verifying connection integrity leveraging certain optimizations such as pre-fetch and caching.

In one embodiment, as illustrated in FIG. 8, a client 812 may communicate with a server 816 via middleboxes 814(1) through 814(n). In this embodiment, at step 801, during setup of the primary TLS sessions, any middlebox 814(1)-(n) that notices a server certificate that does not chain to a globally trusted root may request the next upstream certificate and/or may send that request without waiting for client 812 or any other downstream participant to request that next upstream certificate. In some examples, this may dramatically improve latency from a client perspective.

In some examples, at step 802, if upstream middleboxes have similarly prefetched the yet further upstream certificate, the upstream middleboxes may return the yet further upstream certificate immediately. Otherwise, the upstream middleboxes may now request the yet further upstream certificate. In one example, at step 803, if the next upstream middlebox returned a certificate that does not chain to a globally trusted root, then this middlebox may request the next certificate yet further upstream.

In some examples, at step 804, because middlebox 814(1) may have already prefetched the full ordered set of certificates from each of the other upstream participants, client 812 may on the first request immediately receive this full ordered list of certificates representing each of the upstream middleboxes 814(1)-(*n*). In some embodiments, network communication and/or latency may be further improved by configuring each of the participants to cache certificates frequently needed by themselves and/or their downstream participants.

As described in connection with methods 300 and 400 above, the systems and methods described herein may enable middleboxes to deliver all of their valuable functionality including both listening to traffic and effectively blocking attacks by dynamically modifying content, but do so while also ensuring end-to-end integrity protection of content from the original server, and while giving clients visibility into some or all middleboxes including middleboxes further upstream, without requiring modification of any widely implemented protocols such as TLS. In some examples, when a client receives a certificate from a TLS server in setting up a TLS session, the client may first check to see if the certificate chains to a globally trusted root, such as roots routinely shipped by most browser and/or operating system vendors, or whether the certificate chains to a root existing in the local trust store of the device, but not globally trusted by browser and/or operating system vendors. If the certificate chains to a globally trusted root, the client may then begin sending data over the connection. If the certificate chains to locally trusted root which is not globally trusted, then the client may respond by requesting a certificate from the next upstream device from the client. The nearest middlebox mediating the client/server communication may then respond to the client by providing the upstream certificate. The upstream certificate may be the original server's certificate, or, if multiple middleboxes are mediating the client/server communications, then the upstream certificate may be the certificate of the next middlebox upstream. Middleboxes may request upstream certificates from each other just as clients request upstream certificates from middleboxes. If a middlebox sends a client an upstream certificate which is not the original TLS server's certificate chaining to a trusted root, then the client may request the next certificate yet further upstream, and may continue to do so iteratively until the client receives an acceptable certificate such as the original TLS server certificate chaining to a globally trusted root. In some embodiments, the client may stall the TLS session setup until after receiving an acceptable certificate.

Additionally, once the session is setup, the originating server may sign all content and/or may sign a manifest describing the content. If any middlebox tampers with the content, the middlebox may sign the content, and sign those signatures into a new manifest and may also include a copy of the server's manifest such that a client is able to determine if contents were removed instead of replaced. In one embodiment, servers and middleboxes may send such manifests through a protocol running in parallel to the TLS session. In some examples, the manifests may include signatures on cryptographically strong hashes of content. In other examples, the manifests may include asymmetric cryptographic operations on the full length of the content. In some embodiments, for servers which cannot be modified to support this portion of the protocol, a middlebox near the server may act as a reverse proxy for the server in order to enable the server to indirectly support this feature without modifying the server. By giving clients visibility into the middleboxes that handle traffic between the client and the server and the changes that middleboxes make to content from the server, the systems and methods described herein may increase the security of connections and enable clients to more easily verify the integrity of secure connections.

Figure 9:
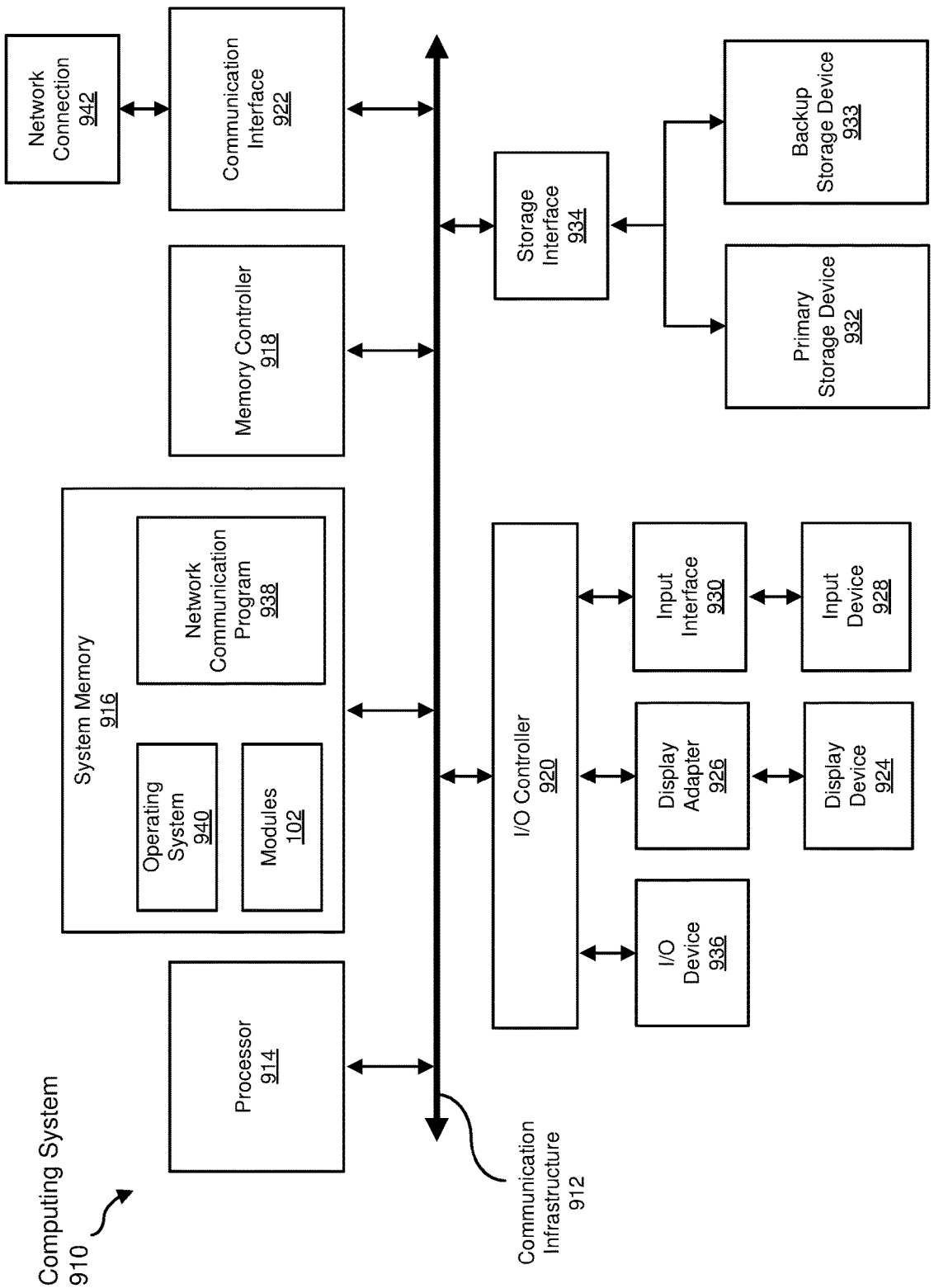
FIG. 9 is a block diagram of an example computing system capable of implementing one or more of the embodiments described and/or illustrated herein.

FIG. 9 is a block diagram of an example computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In some examples, system memory 916 may store and/or load an operating system 940 for execution by processor 914. In one example, operating system 940 may include and/or represent software that manages computer hardware and software resources and/or provides common services to computer programs and/or applications on computing system 910. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

As illustrated in FIG. 9, computing system 910 may also include at least one display device 924 coupled to I/O controller 920 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, example computing system 910 may also include at least one input device 928 coupled to I/O controller 920 via an input interface 930. Input device 928 generally represents any type or form of input device capable of providing input, either computer or human generated, to example computing system 910. Examples of input device 928 include, without limitation, a keyboard, a pointing device, a speech recognition device, variations or combinations of one or more of the same, and/or any other input device.

Additionally or alternatively, example computing system 910 may include additional I/O devices. For example, example computing system 910 may include I/O device 936. In this example, I/O device 936 may include and/or represent a user interface that facilitates human interaction with computing system 910. Examples of I/O device 936 include, without limitation, a computer mouse, a keyboard, a monitor, a printer, a modem, a camera, a scanner, a microphone, a touchscreen device, variations or combinations of one or more of the same, and/or any other I/O device.

Communication interface 922 broadly represents any type or form of communication device or adapter capable of facilitating communication between example computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

In some examples, system memory 916 may store and/or load a network communication program 938 for execution by processor 914. In one example, network communication program 938 may include and/or represent software that enables computing system 910 to establish a network connection 942 with another computing system (not illustrated in FIG. 9) and/or communicate with the other computing system by way of communication interface 922. In this example, network communication program 938 may direct the flow of outgoing traffic that is sent to the other computing system via network connection 942. Additionally or alternatively, network communication program 938 may direct the processing of incoming traffic that is received from the other computing system via network connection 942 in connection with processor 914.

Although not illustrated in this way in FIG. 9, network communication program 938 may alternatively be stored and/or loaded in communication interface 922. For example, network communication program 938 may include and/or represent at least a portion of software and/or firmware that is executed by a processor and/or Application Specific Integrated Circuit (ASIC) incorporated in communication interface 922.

As illustrated in FIG. 9, example computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 910 may be configured as an Application Specific Integrated Circuit (ASIC) adapted to implement one or more of the example embodiments disclosed herein.

Figure 10:
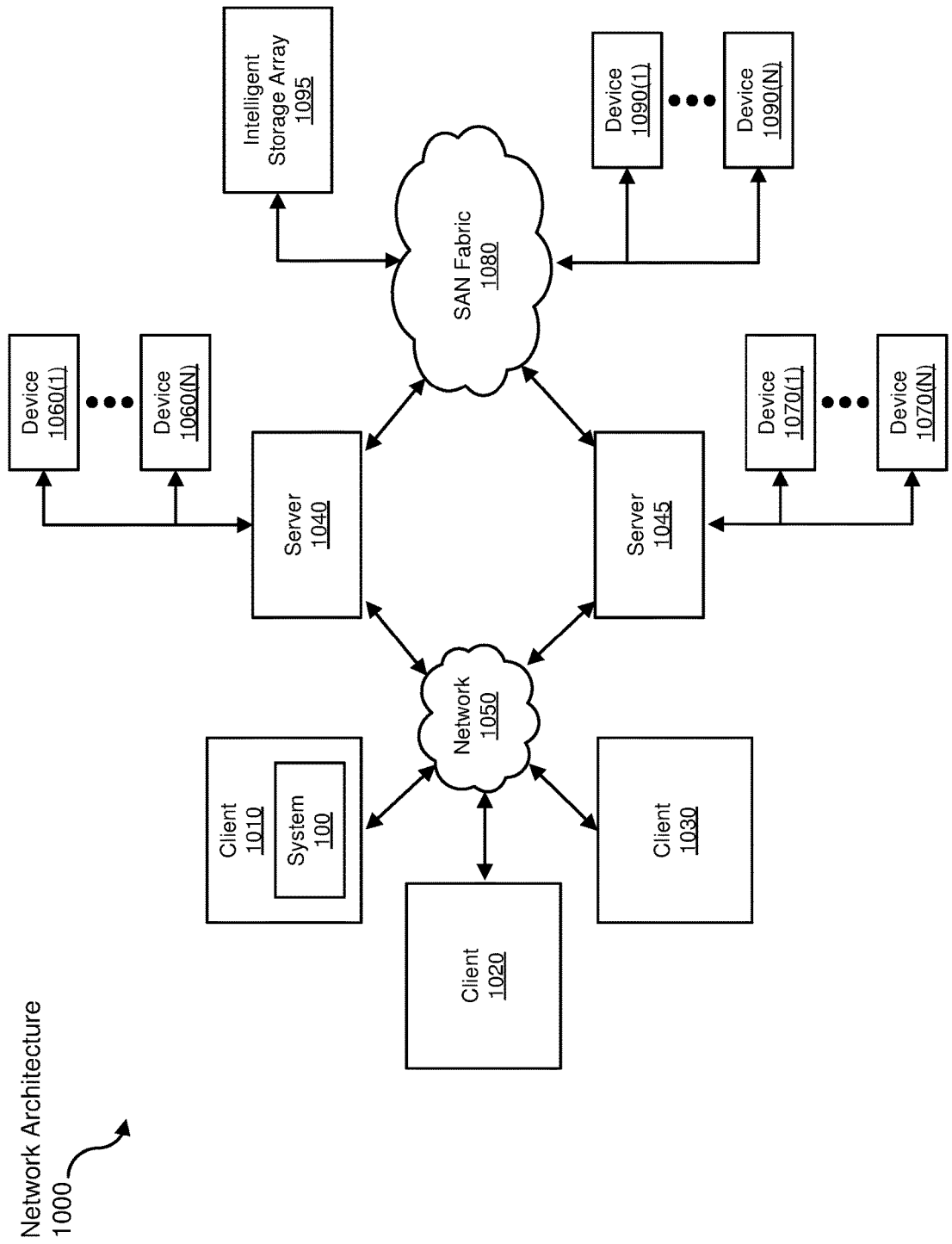
FIG. 10 is a block diagram of an example computing network capable of implementing one or more of the embodiments described and/or illustrated herein.

FIG. 10 is a block diagram of an example network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as example computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to example computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the example embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an example method for verifying connection integrity.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data to be transformed, transform the data by adding, removing, or modifying items of data, output a result of the transformation to another device, use the result of the transformation to improve security and/or comply with regulations, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying connection integrity, at least a portion of the method being performed by a computing device comprising at least one processor, the method comprising:
    configuring a middlebox that is capable of examining traffic between a client computing device and a server to execute a middlebox security application distributed by a security vendor;
    receiving, by the middlebox, a request from the client computing device to initiate a connection to the server via the middlebox using a transport layer security protocol;
    determining that the client computing device is configured to execute a client security application distributed by the security vendor;
    by the middlebox and via a side protocol that facilitates communication between the middlebox security application and the client security application, and operates independently of the transport layer security protocol:
    receiving, from the client computing device, a request for a certificate for the middlebox that attests to a trustworthiness of the middlebox;
    sending the certificate for the middlebox to the client computing device, thereby enabling the client computing device to evaluate a trustworthiness of the transport layer security protocol between the middlebox and the client computing device;
    receiving a request from the client computing device that requests an additional certificate from a device upstream of the middlebox that attests to the device upstream of the middlebox, wherein the device upstream of the middlebox comprises at least one of an additional middlebox and a server;
    requesting the additional certificate from the device upstream from the middlebox;
    receiving, from the device upstream of the middlebox, the additional certificate for the device upstream of the middlebox; and
    sending the additional certificate to the client computing device, thereby enabling the client computing device to evaluate the trustworthiness of the device upstream of the middlebox;
    relaying data from the client computing device to the server, using the transport layer security protocol, via the connection that was validated by the client computing device, based at least in part on the client computing device determining that the additional certificate is globally trusted, in response to the middlebox sending the additional certificate;
    receiving, via the connection, using transport layer security protocol, from an upstream device, data originating from the server and bound for the client computing device;
    receiving, from the upstream device via the side protocol, a manifest that describes the data;
    altering the data bound for the client computing device;
    creating a new manifest that describes the altered data;
    signing the new manifest that describes the altered data with a key corresponding to the certificate for the middlebox;
    sending the altered data to the client computing device via the via the connection, using transport layer security protocol; and
    sending the new manifest that describes the altered data to the client computing device via the side protocol.

2. The computer-implemented method of claim 1, wherein the certificate for the middlebox comprises a dynamically generated certificate that identifies the middlebox as being the server.

3. The computer-implemented method of claim 1, wherein sending, from the middlebox to the client computing device, via the side protocol, the additional certificate for the device upstream from the middlebox comprises:
    receiving, from the client computing device, via the side protocol, a request for a certificate for each successive device immediately upstream from a most recent device for which the middlebox has sent a certificate until the client computing device receives a certificate from the middlebox that is recognized as globally trusted by the client computing device; and
    sending, from the middlebox to the client computing device, via the side protocol, the certificate for each successive device immediately upstream from the most recent device for which the middlebox has sent a certificate until the client computing device receives the certificate from the middlebox that is recognized as globally trusted by the client computing device.

4. The computer-implemented method of claim 1, wherein altering the data bound for the client computing device comprises decrypting the data bound for the client computing device in order to examine the data.

5. The computer-implemented method of claim 1, further comprising, by the middlebox and via the side protocol executing independently he transport layer security protocol:

receiving, from the server, a request for a certificate for the middlebox that attests to the trustworthiness of the client computing device;

sending, the certificate for the middlebox to the server;

receiving, from the server, a request for a certificate from the client computing device that attests to the trustworthiness of the client computing device;

requesting, from the client computing device, the certificate for the client computing device;

receiving, from the client computing device, the certificate for the client computing device that attests to the trustworthiness of the client computing device; and sending, from the middlebox to the server, the certificate for the client computing device.

6. A non-transitory computer-readable medium comprising one or more computer-readable instructions that, when executed by at least one processor of a computing device, cause the computing device to:

configure a middlebox that is capable of examining traffic between a client computing device and a server to execute a middlebox security application distributed by a security vendor;

receive, by the middlebox, a request from the client computing device to initiate a connection to the server via the middlebox using a transport layer security protocol;

determine that the client computing device is configured to execute a client security application distributed by the security vendor;

by the middlebox and via a side protocol that facilitates communication between the middlebox security application and the client security application, and operates independently of the transport layer security protocol:

receive, from the client computing device, a request for a certificate for the middlebox that attests to a trustworthiness of the middlebox;

send the certificate for the middlebox to the client computing device, thereby enabling the client computing device to evaluate a trustworthiness of the transport layer security protocol between the middlebox and the client computing device;

receive a request from the client computing device that requests an additional certificate from a device upstream of the middlebox that attests to the device upstream of the middlebox, wherein the device upstream of the middlebox comprises at least one of an additional middlebox and a server;

request the additional certificate from the device upstream from the middlebox; receive, from the device upstream of the middlebox, the additional certificate for the device upstream of the middlebox; and send the additional certificate to the client computing device, thereby enabling the client computing device to evaluate the trustworthiness of the device upstream of the middlebox;

relay data from the client computing device to the server, using the transport layer security protocol, via the connection that was validated by the client computing device, based at least in part on the client computing device evaluating the trustworthiness of the device upstream of the middlebox, in response to the middlebox sending the additional certificate;

receive, via the connection, using transport layer security protocol, from the device upstream of the middlebox, data originating from the server and bound for the client computing device;

receive, from the device upstream of the middlebox via the side protocol, a manifest that describes the data;

alter the data bound for the client computing device;

create a new manifest that describes the altered data;

sign the new manifest that describes the altered data with a key corresponding to the certificate for the middlebox;

send the altered data to the client computing device via the via the connection, using transport layer security protocol; and send the new manifest that describes the altered data to the client computing device via the side protocol.

7. The computer-readable medium of claim 6, wherein the instructions cause the one or more physical processors to, by the client computing device, via the side protocol, request the additional certificate by:

requesting, by the client computing device, from the middlebox, via the side protocol, a certificate for a device immediately upstream of the middlebox;

receiving, by the client computing device, from the middlebox, via the side protocol, the certificate for the device immediately upstream of the middlebox; and continuing to request, by the client computing device, from the middlebox, via the side protocol, a certificate for each successive device immediately upstream from a most recent device for which the client computing device has received a certificate until the client computing device receives a certificate that is recognized as globally trusted by the client computing device.

8. The computer-readable medium of claim 7, wherein the client computing device continues to request the certificate for each successive device until the client computing device receives a certificate for the server.

9. The computer-readable medium of claim 6, wherein the middlebox is capable of modifying traffic between the client computing device and the server.

10. The computer-readable medium of claim 6, further comprising displaying to a user of a client computing device a notification indicating that the data from the server was altered by the middlebox.

11. The computer-readable medium of claim 6, wherein evaluating the trustworthiness of the device upstream of the middleboxdetermining that the additional certificate for the device upstream from the middlebox is recognized as globally trusted by the client computing device comprises determining, by the client computing device, that the additional certificate is chained to a globally trusted root certificate.

12. A system for verifying connection integrity, the system comprising:

one or more physical processors;

one or more memory devices comprising instructions that, when executed by the one or more physical processors, cause the one or more physical processors to:

configure a middlebox that is capable of examining traffic between a client computing device and a server to execute a middlebox security application distributed by a security vendor;

receive, by the middlebox, a request from the client computing device to initiate a connection to the server via the middlebox using a transport layer security protocol;

determine that the client computing device is configured to execute a client security application distributed by the security vendor;

by the middlebox and via a side protocol that facilitates communication between the middlebox security application and the client security application, and operates independently of the transport layer security protocol:

receive, from the client computing device, a request for a certificate for the middlebox that attests to a trustworthiness of the middlebox;

send the certificate for the middlebox to the client computing device, thereby enabling the client computing device to evaluate a trustworthiness of the transport layer security protocol between the middlebox and the client computing device;

receive a request from the client computing device that requests an additional certificate from a device upstream of the middlebox that attests to the device upstream of the middlebox, wherein the device upstream of the middlebox comprises at least one of an additional middlebox and a server;

request the additional certificate from the device upstream from the middlebox;

receive, from the device upstream of the middlebox, the additional certificate for the device upstream of the middlebox; and send sending the additional certificate to the client computing device, thereby enabling the client computing device to evaluate the trustworthiness of the device upstream of the middlebox; and relay data from the client computing device to the server, using the transport layer security protocol, via the connection that was validated by the client computing device, based at least in part on the client computing device determining that the additional certificate is globally trusted, in response to the middlebox sending the additional certificate;

receive, via the connection, using transport layer security protocol, from the device upstream of the middlebox, data originating from the server and bound for the client computing device;

receive, from the device upstream of the middlebox via the side protocol, a manifest that describes the data;

alter the data bound for the client computing device;

create a new manifest that describes the altered data;

sign the new manifest that describes the altered data with a key corresponding to the certificate for the middlebox;

send the altered data to the client computing device via the via the connection, using transport layer security protocol; and send the new manifest that describes the altered data to the client computing device via the side protocol.

13. The system of claim 12, wherein the certificate for the middlebox that attests to the trustworthiness of the middlebox comprises a dynamically generated certificate that identifies the middlebox as being the server.

14. The system of claim 12, wherein the instructions cause the one or more physical processors to, by the client computing device, via the side protocol, request the additional certificate by:

requesting, by the client computing device, from the middlebox, via the side protocol, a certificate for a device immediately upstream of the middlebox;

receiving, by the client computing device, from the middlebox, via the side protocol, the certificate for the device immediately upstream of the middlebox; and continuing to request, by the client computing device, from the middlebox, via the side protocol, a certificate for each successive device immediately upstream from a most recent device for which the client computing device has received a certificate until the client computing device receives a certificate that is recognized as globally trusted by the client computing device.

15. The system of claim 12, wherein the instructions cause the one or more physical processors to, by the middlebox, alter the data bound for the client computing device by decrypting the data bound for the client computing device in order to examine the data.

16. The system of claim 12, wherein the instructions cause the one or more physical processors to:

receive, by the middlebox, from the server, via the side protocol executing independently of the transport layer security protocol, a request for a certificate for the middlebox that attests to the trustworthiness of the middlebox;

send, by the middlebox to the server, via the side protocol, the certificate for the middlebox;

receive, by the middlebox, from the server, via the side protocol, a request for a certificate from the client computing device that attests to the trustworthiness of the client computing device;

request, by the middlebox, from the client computing device, via the side protocol, the certificate for the client computing device;

receive, by the middlebox, from the client computing device, via the side protocol, the certificate for the client computing device that attests to the trustworthiness of the client computing device; and send, from the middlebox to the server, via the side protocol, the certificate for the client computing device.

17. The system of claim 12, wherein the instructions cause the one or more physical processors to determine that the additional certificate for the device upstream from the middlebox is recognized as globally trusted by the client computing device by determining, by the client computing device, that the additional certificate is chained to a globally trusted root certificate.

\* \* \* \* \*

UNITED STATES PATENT AND TRADEMARK OFFICE
CERTIFICATE OF CORRECTION

| | | |
|---|---|---|
| PATENT NO. | : 10,958,666 B1 | Page 1 of 1 |
| APPLICATION NO. | : 15/468391 | |
| DATED | : March 23, 2021 | |
| INVENTOR(S) | : Brian Witten et al. | |

It is certified that error appears in the above-identified patent and that said Letters Patent is hereby corrected as shown below:

In the Claims

Claim 11, Column 36, Lines 42-47 should read:
evaluating the trustworthiness of the device upstream of the middlebox comprises determining, by the client computing device, that the additional certificate is chained to a globally trusted root certificate.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*